(12) United States Patent
Everard et al.

(10) Patent No.: US 11,497,226 B2
(45) Date of Patent: Nov. 15, 2022

(54) LECITHIN DERIVED FROM HIGH-OLEIC SOYBEANS

(71) Applicant: E I DU PONT DE NEMOURS AND COMPANY, Wilmington, DE (US)

(72) Inventors: John D. Everard, Grimes, IA (US); Susan Knowlton, Marco Island, FL (US)

(73) Assignee: E. I. DU PONT DE NEMOURS AND COMPANY

( * ) Notice: Subject to any disclaimer, the term of this patent is extended or adjusted under 35 U.S.C. 154(b) by 307 days.

(21) Appl. No.: 15/520,727

(22) PCT Filed: Oct. 22, 2015

(86) PCT No.: PCT/US2015/056913
§ 371 (c)(1),
(2) Date: Apr. 20, 2017

(87) PCT Pub. No.: WO2016/065144
PCT Pub. Date: Apr. 28, 2016

(65) Prior Publication Data
US 2017/0332654 A1 Nov. 23, 2017

Related U.S. Application Data

(60) Provisional application No. 62/156,520, filed on May 4, 2015, provisional application No. 62/067,943, filed on Oct. 23, 2014.

(51) Int. Cl.
A23D 9/013 (2006.01)
C11B 5/00 (2006.01)

(52) U.S. Cl.
CPC ............ *A23D 9/013* (2013.01); *C11B 5/0007* (2013.01); *C11B 5/0021* (2013.01);
(Continued)

(58) Field of Classification Search
None
See application file for complete search history.

(56) References Cited

U.S. PATENT DOCUMENTS

2009/0162522 A1* 6/2009 Lai ..................... A23D 7/0053
426/590

FOREIGN PATENT DOCUMENTS

CA 2 299 800 * 8/2001
CN 102517142 A 6/2012
(Continued)

OTHER PUBLICATIONS

Judde et al., "Antioxidant Effect of Soy Lecithins on Vegetable Oil Stability and Their Synergism with Tocopherols"—JAOCS, vol. 80, No. 12 (2003), pp. 1209-1215. (Year: 2003).*
(Continued)

*Primary Examiner* — Elizabeth Gwartney

(57) ABSTRACT

Disclosed are compositions and methods relating to lecithin obtained from high-oleic soybeans. The high-oleic lecithin imparts improved characteristics to a product when compared to lecithin obtained from commodity soybeans. Examples of improved characteristics may include one or more of increased effective release, increased oxidative stability, increased OSI induction time, increased shelf life, increased smoke point, and a reduction in the increase in viscosity induced by oxidation or heat.

19 Claims, 2 Drawing Sheets

(52) U.S. Cl.
CPC .......... *C11B 5/0028* (2013.01); *C11B 5/0071* (2013.01); *C11B 5/0085* (2013.01); *C11B 5/0092* (2013.01); *C11B 5/00* (2013.01)

(56) References Cited

FOREIGN PATENT DOCUMENTS

| EP | 0 870 840 A2 | 10/1998 |
|---|---|---|
| JP | H06-253738 A | 9/1994 |
| JP | 2000-279092 A | 10/2000 |
| JP | 2014-018170 A | 2/2014 |
| WO | 97/40698 A1 | 11/1997 |

OTHER PUBLICATIONS

Kinney et al., "10. Designer oils: the high oleic acid soybean"—Genetic modification in the Food Industry, S. Roller et al. (eds.), 1998, Chapman & Hall, pp. 193-213. (Year: 1998).*

Burkhardt, H. J.: "Phosphatides Isolated From Seeds of Commercial and Experimental Safflower Varieties", Journal of the American Oil Chemists' Society, Nov. 1971, vol. 48, No. 11, pp. 697-699.

Communication forwarding Oberservations by Third Parties in EP3209138, dated Jan. 22, 2019.

International Search Report and Written Opinion for International Application No. PCT/US2015/056913, dated Apr. 14, 2016.

Wang, Tong, et al.: "Natural Refining of Extruded-Expelled Soybean Oils Having Various Fatty Acid Compositions", Department of Food Science and Human Nutrition and Center for Crops Utilization Research, Jan. 1, 2001 (Jan. 1, 2001), pp. 461-466.

* cited by examiner

Effect of high oleic lecithin on viscosity

LECITHIN DERIVED FROM HIGH-OLEIC SOYBEANS

CROSS REFERENCE TO RELATED APPLICATIONS

This application claims the benefit of U.S. Provisional Application No. 62/067,943 filed Oct. 23, 2014 and of U.S. Provisional Application No. 62/156,520 filed May 4, 2015, the entire contents of each of which are herein incorporated by reference.

FIELD OF THE INVENTION

This invention relates to compositions and methods, comprising high-oleic lecithin in combination with high-oleic soybean and other high stability oils, wherein the compositions impart unexpectedly improved characteristics.

BACKGROUND OF THE INVENTION

Lecithin is a material obtained by degumming crude vegetable oils and drying the hydrated gums. In the U.S., commercial lecithin is predominantly derived from soybean oil, but it may be obtained from other vegetable and animal sources, such as corn oil, safflower oil or egg yolk. Lecithin contains a mixture of phospholipids, triglycerides and other non-phospholipid compounds removed from the oil in the degumming process. Lecithin gums may be further processed to make commercially important lecithin products used in a variety of food and industrial products, such as emulsifiers, dispersants, wetting agents, viscosity modifiers, release agents, surfactants and nutritional supplements. Lecithin uses include smoothing the texture of food items such as chocolate and margarine and aiding in the dissolving of instant foods. Food items, which most frequently incorporate lecithin, include baked goods, confections, Infant formulas, and cheese products. Industrial applications for lecithin include paints, coatings, plastics, cosmetics and magnetic tape media.

SUMMARY OF THE INVENTION

In some embodiments, methods for improving the characteristics or properties of a product include the steps of combining an oil selected from one or more of a high stability oil, a partially or completely hydrogenated high stability oil, or a hydrogenated commodity vegetable oil with a high-oleic soybean seed lecithin in an amount effective to improve at least one characteristic or property of the product. High stability oils include, but are not limited to high-oleic soybean seed oil, mineral oil, mid- or high-oleic sunflower oil, low lin- or high-oleic canola oil, high-oleic safflower oil, palm oil, palmolein oil, or olive oil. Partially or completely hydrogenated high stability oils include, but are not limited to high-oleic soybean seed oil, mid- or high-oleic sunflower oil, low lin- or high-oleic canola oil, high-oleic safflower oil, olive oil, palm oil, or palmolein oil. Hydrogenated commodity oils include, but are not limited to cotton oil, soybean oil, peanut oil, safflower oil, corn oil, rice bran, canola oil, or sunflower oil. The characteristic or property can be one or more of effective release, OSI induction time, increased shelf life, increased smoke point, a reduction in viscosity, a reduction in the increase in viscosity induced by oxidation or heat, and a combination thereof, when compared to a control product. The reduction in viscosity may be measured following oxidative-induced and/or heat-induced increases in viscosity in the products provided herein compared with a similarly heat-treated and/or oxidatively-treated control product.

In some embodiments the compositions have decreased viscosity. The decrease in viscosity comprises a reduction in an increase in viscosity induced by oxidation or heat.

In some embodiments, products containing high-oleic soybean seed lecithin in an amount of at least 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % are provided.

In some embodiments, products contain high-oleic soybean seed lecithin and an oil such as a high-stability oil, such as high-oleic soybean oil.

In some embodiments, a method for releasing a product from a surface is provided in which the product, the surface, or a combination thereof is contacted with a composition comprising a high-oleic soybean seed lecithin, wherein the composition increases the effective release of the product from the surface by a percent increase of at least 10% when compared to a control product comprising a commodity soybean lecithin.

In some embodiments, the compositions include a high-oleic lecithin and one or more of water, ethanol, acetone or other organic solvent, and one or more of an oil, such as a high-oleic soybean oil, a mineral oil, mid- or high-oleic sunflower oil, low lin- or high-oleic canola oil, safflower oil, peanut oil, palm oil, palmolein oil, or cotton oil.

In some embodiments a product contains an oil, such as a high-oleic soybean oil, a mineral oil, mid- or high-oleic sunflower oil, low lin- or high-oleic canola oil, safflower oil, peanut oil, palm oil, palmolein oil, or cotton oil, a high-oleic soybean lecithin, and a soybean protein, such as a meal, concentrate or isolate.

BRIEF DESCRIPTION OF THE DRAWINGS

The invention can be more fully understood from the following detailed description and the accompanying drawings, which form a part of this application.

DETAILED DESCRIPTION OF THE INVENTION

Figure 1:
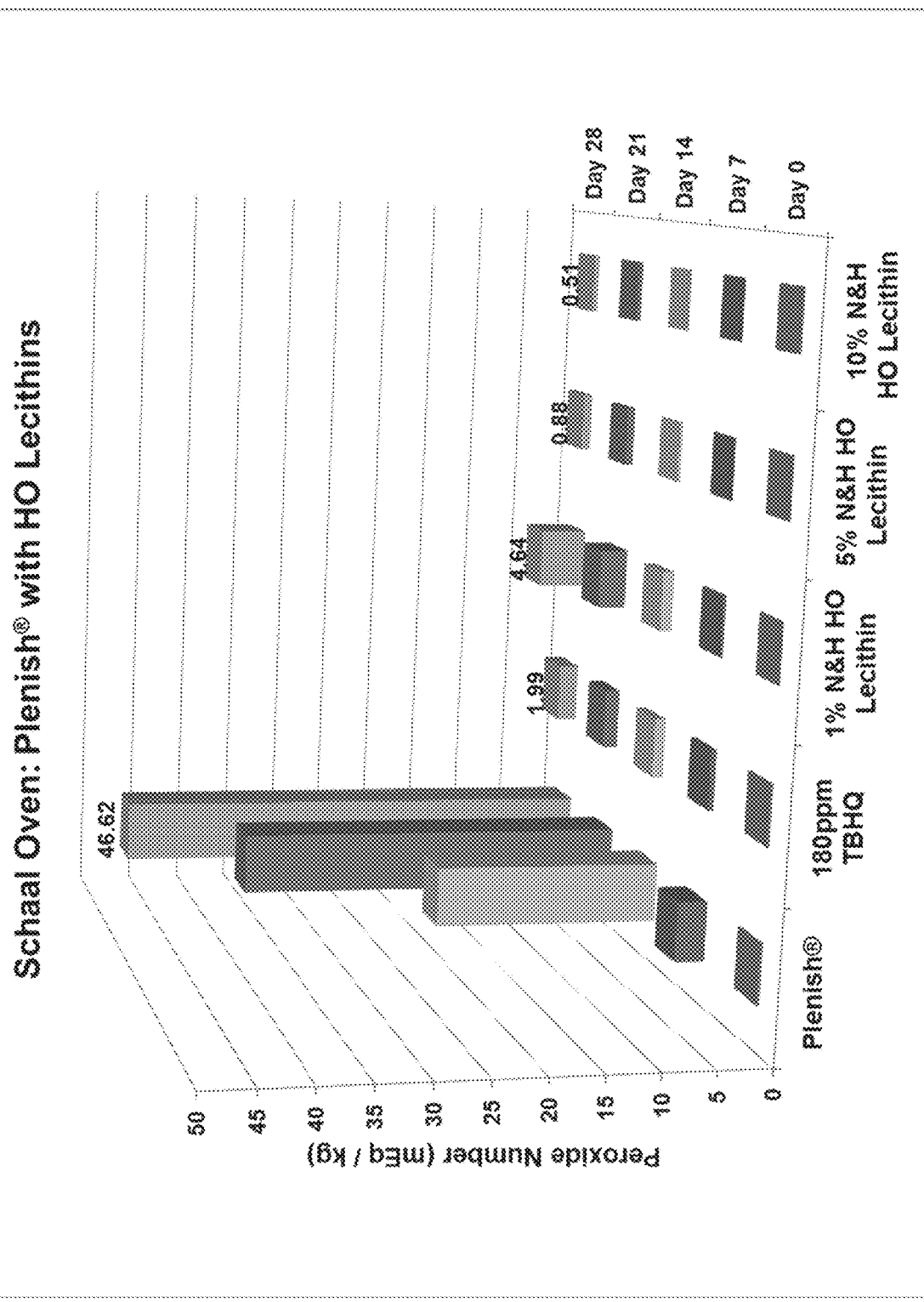
FIG. 1 shows the Peroxide Values before (day 0) and after 7, 14, 21 and 28 days of accelerated aging at 60° C. in a forced air oven (Schaal Oven Test) for high-oleic oil (Plenish®) without inclusion of antioxidants or with inclusion of TBHQ or 1, 5, and 10 wt % of high-oleic lecithins.

Disclosed are methods and uses of lecithin which is a product of high-oleic soybeans. The present inventors surprisingly found that high-oleic lecithin gave improved results when compared with the performance of non-high-oleic lecithin in a number of different applications.

As utilized in accordance with the present disclosure, the following terms, unless otherwise indicated, shall be understood to have the following meanings:

The term "soybean" refers to the species *Glycine max*, *Glycine soja*, or any species that is sexually cross compatible with *Glycine max*. A "line" is a group of plants of similar parentage that display little or no genetic variation between individuals for a least one trait. Such lines may be created by one or more generations of self-pollination and selection, or vegetative propagation from a single parent including by tissue or cell culture techniques.

An "agronomically elite line" or "elite line" refers to a line with desirable agronomic performance that may or may not be used commercially.

A "variety", "cultivar", "elite variety", or "elite cultivar" refers to an agronomically superior elite line that has been extensively tested and is or was being used for commercial soybean production.

"Mutation" refers to a detectable and heritable genetic change (either spontaneous or induced) not caused by segregation or genetic recombination.

"Mutant" refers to an individual, or lineage of individuals, possessing a mutation.

"HO Lecithin" or "HO lecithins" or "high-oleic lecithin" refer generally to a complex, naturally occurring mixture of phospholipids and other polar lipids. The lecithins may comprise glycerols, fatty acids, phosphoric acid, amino alcohols, carbohydrates, and the like. The starting material may also be a deoiled fractionated high-oleic lecithin that is a lecithin separated into subclasses or enriched fractions of high-oleic lecithins. The enriched fractions may be a mixture enriched in phospholipids such as phosphatidyl choline, phosphatidyl ethanolamine, phosphatidyl inositol, phosphatidyl serine, phosphatidyl glycerol, phosphatidic acid, and the like.

The term "high-stability oils" refers to oils which have high stability to oxidation and typically have an OSI value of at least 12 hours at 110° C. Examples of high-stability oils include mineral oil, high-oleic soybean oil, mid- or high-oleic sunflower oil, low lin- or high-oleic canola oil, high-oleic safflower oil, palm oil, palm olein oil, or olive oil. Also included in the invention are compositions comprising partially and fully hydrogenated high stability oils and hydrogenated commodity vegetable oils, such as soybean, canola, corn, safflower, peanut, rice bran, cotton, or sunflower oil.

High stability oils can have an OSI value of at least 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 90, 100, 125, 150, 175, 200, 250, 300, 350, 400, 450 and 500 hours at 110° C.

The high-stability oil can be included in the composition and products at at least about 0.5%, 1%, 2%, 3%, 4%, 5%, 6%, 7%, 8%, 9%, 10%, 11%, 12%, 13%, 14%, 15%, 20%, 25%, 30%, 35%, 40%, 35%, 50%, 60%, 70%, 75%, 80%, 90% or 95% and less than 99%, 98%, 97%, 96%, 95%, 90%, 85%, 80%, 75%, 70%, 65%, 60%, 50%, 40%, 30%, 25% or 20% by weight or volume of either (i) the total weight or volume of the oil and HO lecithin combined, or (ii) by weight or volume of the total composition or product.

The term "fatty acids" refers to long-chain aliphatic acids (alkanoic acids) of varying chain length, from about $C_{12}$ to $C_{22}$ (although both longer and shorter chain-length acids are known). The predominant chain lengths are between $C_{16}$ and $C_{22}$. The structure of a fatty acid is represented by a simple notation system of "X:Y", where X is the total number of C atoms in the particular fatty acid and Y is the number of double bonds.

Generally, fatty acids are classified as saturated or unsaturated. The term "saturated fatty acids" refers to those fatty acids that have no "double bonds" in their carbon backbone. In contrast, "unsaturated fatty acids" have "double bonds" along their carbon backbones (which are most commonly in the cis-configuration). "Monounsaturated fatty acids" have only one "double bond" along the carbon backbone (e.g., usually between the $9^{th}$ and $10^{th}$ carbon atom as for palmitoleic acid (16:1) and oleic acid (18:1), while "polyunsaturated fatty acids" (or "PUFAs") have at least two double bonds along the carbon backbone (e.g., between the $9^{th}$ and $10^{th}$, and $12^{th}$ and $13^{th}$ carbon atoms for linoleic acid (18:2); and between the $9^{th}$ and $10^{th}$, $12^{th}$ and $13^{th}$, and $15^{th}$ and $16^{th}$ for α-linolenic acid (18:3).

The term "total fatty acid content" refers to the sum of the five major fatty acid components found in soybeans, namely C16:0, C18:0, C18:1, C18:2, and C18:3. The term "total polyunsaturated fatty acid content" refers to the total C18:2 plus C18:3 content.

The term "total saturated fatty acid content" refers to the total of C16:0 plus C18:0 content.

The term "percentage points" (pp) refers to the arithmetic difference of two percentages, e.g. [HO value (%)–control value (%)]=percentage points.

The term "relative change", "percent change", "percent increase", or "percent decrease" refers to a change or difference expressed as a fraction of the control value, e.g. {[HO value (%)–control value (%)]/control value (%)}× 100%=percent change.

The term "control" or "control product" refers to, unless otherwise stated, a product or composition that comprises a combination of high-oleic soybean oil and commodity lecithin, wherein the composition is prepared using the same process as the process used to prepare a composition comprising a combination of high-oleic soy oil and high-oleic lecithin. The term "effective release" refers to the minimum amount of release agent used that results in efficient, undamaged release of the product.

The term "percent increase in effective release" or "percent increase in release" refers to the increase in effective release of a product expressed as a percentage wherein the difference of effective release of the control composition and the effective release of the composition of the invention is divided by the effective release of the control composition.

The term "emulsion stability" refers the characteristic that describes the ability of an emulsion to resist coalescence and separation.

A dispensing apparatus such as an aerosol spray apparatus or can or pump spray apparatus can be used to dispense the compositions described herein. Additional components, such as, but not limited to, ethanol or other organic solvents may be included in the spray apparatus or combined with the high-oleic lecithin compositions disclosed.

An aerosol spray can or apparatus refers to a dispenser that holds a substance under pressure and that can release the substance as a fine spray.

A pump spray can or apparatus refers to an unpressurized spray dispenser for liquid that is worked by manual action rather than by internal pressure.

The term "HO soybean oil", "high-oleic soybean oil" or "high-oleic soybean seed oil" refers to soybean oil produced from the processing of high-oleic soybean seeds. High-oleic soybean seed oil is oil that has an oleic acid content of at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 95% of the total fatty acids in the oil. Examples of high-oleic soybean oils are disclosed in World Patent Publication WO1994/011516, the disclosure of which is hereby incorporated by reference.

The term "mid-oleic sunflower oil" refers to a sunflower oil produced from the processing of mid-oleic sunflower seeds. Mid-oleic sunflower oil is oil that has an oleic acid content of at least 60%, 61%, 62%, 63%, 64%, 65%, 66%, 67%, 68%, 69%, 70%, 71%, or 72% and less than 73% of the total fatty acids in the oil.

The term "high-oleic sunflower oil" refers to a sunflower oil produced from the processing of high-oleic sunflower seeds. High-oleic sunflower oil is oil that has an oleic acid content of at least 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 95% of the total fatty acids in the oil. Examples for mid- and high-oleic sunflower oils are disclosed in the factsheet of Sunflower oil, available on the website of the National Sunflower association and in Warner et al. "Compositions of Sunflower, Nusun (Mid-oleic Sunflower) and High-oleic sunflower oils" (proposed draft standard for Mid-Oleic Sunflower Oil, 2003, available on the website of the National Sunflower association), the disclosures of which are incorporated herewith by reference.

The term "low-lin canola oil" refers to low-linolenic canola oil produced from the processing of low-linolenic acid canola seeds. Low-lin canola oil is oil that has an oleic acid content of at least 60%, 61%, 62%, 63%, 64%, 65%, 66%, 67%, 68%, 69%, 70%, 71%, or 72% of the total fatty acids in the oil and a linolenic acid of less than 10%, 9%, 8%, 7%, 6%, 5%, 4%, 3%, 2% or 1% of the total fatty acids in the oil.

The term "high-oleic canola oil" refers to canola oil produced from the processing of high-oleic canola seeds. High-oleic canola oil is oil that has an oleic acid content of at least 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 95% of the total fatty acids in the oil. Examples for low lin- and high-oleic canola oils and their compositions can be found in Linsen et al, 2012 AOCS. "High-oleic canola oils and their food applications", the disclosure of which is incorporated herewith by reference.

The term "high-oleic safflower oil" refers to safflower oil produced from the processing of high-oleic safflower seeds. High-oleic safflower oil is oil that has an oleic acid content of at least 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 95% of the total fatty acids in the oil.

The oils disclosed herein may be derived or generated from transgenic and non-transgenic seeds. For example high-oleic oils can be generated via transgenic methods or via mutations in the appropriate genes. US patent application U.S. Ser. No. 12/282,696, published 13 Aug. 2009 discloses Fad-2 mutants in *Brassica* that lead to a high-oleic phenotype. The disclosure of which is incorporated herewith by reference. US patent application U.S. Ser. No. 13/379, 553, published 26 Apr. 2012, discloses mutations that increase the oleic acid content in soybean oil. The disclosure of which is incorporated herewith by reference. Pham et al. 2010, BMC Plant Biology: 10:195, disclose mutant alleles of FAD2-1A and FAD2-1B that combined produce soybeans with the high-oleic trait. U.S. Pat. No. 6,872,872 issued 29 Mar. 2005 discloses the creation of transgenic plants with altered levels of unsaturated fatty acids using chimeric genes comprising fatty acid desaturase sequences. The disclosure of which is incorporated herewith by reference. U.S. Pat. No. 5,981,781, issued 11 Sep. 1999, discloses high-oleic soybean oil generated from transgenic high-oleic soybeans. The disclosure of which is incorporated herewith by reference.

The term "HO lecithin", "high-oleic lecithin", "high-oleic soybean lecithin" or "high-oleic soybean seed lecithin" refers to lecithin produced from the processing of high-oleic soybean seeds that carry the high-oleic trait. High-oleic soybean seed lecithin refers to lecithin with an oleic acid content of at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 95% of the total fatty acid content of the lecithin; such values can be expressed on a relative fatty acid content or weight percentage (wt %) basis.

The high-oleic trait is described further below.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

In some embodiments, the compositions include combinations of high-oleic lecithin with oils, such as but not limited to mineral oil, mid- or high-oleic sunflower oil, low-lin or high-oleic canola oil, safflower oil, peanut oil, palm oil, palm olein oil, or cotton oil. The control may comprise a combination of an oil such as, but not limited to, mineral oil, mid- or high-oleic sunflower oil, low-lin or high-oleic canola oil, safflower oil, peanut oil, palm oil, palm olein oil, or cotton oil with commodity lecithin, wherein the process to prepare the one or more compositions containing high-oleic lecithin and the one or more control compositions is the same process.

Lecithins are surface-active: simultaneous hydrophilic (water-loving) and hydrophobic (water-repelling) properties enable lecithins to make stable blends of materials that otherwise do not mix easily and tend to separate. The amount of lecithin needed to blend substances such as soybean oil and water in margarine, or the pigment and latex in paint, depends on the overall fat content in the end product. Lecithins also have characteristics that help disperse and suspend powders into liquids, control or reduce the viscosity of liquids and semi-liquids, prevent foods from sticking to contact surfaces and prevent adhesion of food products to one another. The compositions disclosed herein (e.g. combinations of HO lecithin and HO soybean oil, HO lecithin and mineral oil, HO lecithin and mid- or high-oleic sunflower oil, HO lecithin and low-lin or high-oleic canola oil, HO lecithin and safflower oil, HO lecithin and peanut oil, HO lecithin and palm oil, HO lecithin and palm olein oil, or HO lecithin and cotton oil) are intended to improve at least one of the aforementioned characteristics.

In some embodiments, HO lecithin is combined with an oil such as one or more of mineral oil, mid- or high-oleic sunflower oil, low-lin or high-oleic canola oil, safflower oil, peanut oil, palm oil, palm olein oil, or cotton oil.

The HO lecithin can be included in the composition at at least about 0.5%, 1%, 2%, 3%, 4%, 5%, 6%, 7%, 8%, 9%, 10%, 11%, 12%, 13%, 14%, 15%, 20%, 25%, 30%, 35%, 40%, 35%, 50%, 60%, 70%, 75%, 80%, 90% or 95% A and less than 99%, 98%, 97%, 96%, 95%, 90%, 85%, 80%, 75%, 70%, 65%, 60%, 50%, 40%, 30%, 25% or 20% by weight or volume of either (i) the total weight or volume of the oil and HO lecithin combined, or (ii) by weight or volume of the total composition or product.

In some embodiments, compositions or products contain combinations of high-oleic soybean oil and high-oleic lecithin, each obtained from high-oleic soybeans wherein the compositions have at least one altered characteristic selected from the group consisting of increased oxidative stability, reduced viscosity (resulting from the inhibition of oxidative- and heat-induced increases in oil viscosity), increased effective release, increased OSI induction time, increased emulsion stability, increased shelf life, increased smoke point, and a combination thereof when compared to a control.

In some embodiments the compositions have decreased viscosity. The decrease in viscosity comprises a reduction in an increase in viscosity induced by oxidation or heat.

The term commodity soybean refers to soybean seeds that do not carry the high-oleic transgenic or non-transgenic, e.g. mutant, trait.

The term commodity soybean oil refers to soybean oil produced from processing commodity soybean seeds that do not carry the high-oleic transgenic or non-transgenic, e.g. mutant, trait.

The term commodity soybean lecithin refers to soybean lecithin produced from processing commodity soybean seeds that do not carry the high-oleic transgenic or non-transgenic, e.g. mutant trait.

In some embodiments, the compositions disclosed herein can be used as a blending source to make a blended product. By a blending source, it is meant that the compositions described herein can be mixed with other components, such as vegetable oils, as aqueous solution or with diluents such as ethanol or other organic solvents. The blending source may improve the characteristics of the product, such as, but not limited to, fatty acid composition, flavor, oxidative stability, reduced viscosity (resulting from inhibition of oxidative- and heat-induced increases in oil viscosity increase), release and antistick properties, spray ability and emulsifiability of the blended product. The amount of oil, aqueous solution or other diluent which can be used will depend upon the desired properties sought to be achieved in the resulting final blended oil product. Examples of blended oil products for example include, but are not limited to, margarines, shortenings, frying oils, salad oils, cosmetics, release agents etc.

The high-oleic lecithin products or compositions may also undergo chemical or enzymatic modifications to make them more suitable for certain applications, such as the use of high-oleic lecithin as a release agent. Such modifications have been described and are known to those of skill in the art, for example, in U.S. Pat. No. 4,479,977, which is incorporated herein by reference in its entirety. Modifications can include, for example, fractionation in alcohol, fractionation in acetone, hydrolysis, acetylation, hydroxylation, or addition of an organic anhydride, such as acetic anhydride. The organic anhydride can be added at at least about 1 wt % or vol %, at least about 2% or vol %, at least about 3% or vol %, and less than about 10 wt % or vol %, less than about 7 wt % or vol %, less than about 6 wt % or vol % or less than about 5 wt % or vol %.

Production of lecithin: Lecithin can be prepared from soy oil by standard procedures known to the skilled in the art, generally used for the preparation of lecithin from commodity soybeans (KeShun Liu, Soybeans, Chemistry, Technology, and Utilization, printed 1997 by Chapman & Hall, 115 Fifth Ave, New York 10003, pages 313-315, and 340-341, W. Van Nieuwenzhuyzen, Lecithin Production and Properties, J. Am. Oil Chemists Soc., June 1976, 53:425-427). Methods for the extraction and processing of soybean seeds to produce soybean oil, meal, and by-products, such as lecithin, are well known throughout the soybean processing industry. In general, soybean oil is produced from cleaned, tempered, dehulled, and flaked soybeans using solvent (hexane) extraction or a combination of physical pressure and/or solvent extraction. A more detailed reference to soybean seed processing, soybean oil production and byproduct utilization can be found in Erickson, 1995, Practical Handbook of Soybean Processing and Utilization, The American Oil Chemists' Society and United Soybean Board.

In general lecithin is derived from soy oil in four steps: hydration of phosphatides, separation of the sludge, drying, and cooling. Such lecithins will have water in oil (w/o) and oil in water (o/w) soluble properties. Products with improved emulsifying properties can be obtained by modifications, involving mainly fractionation in alcohol, hydrolysis (enzymatic, acid or alkali), acetylation, or hydroxylation. The high-oleic lecithins described herein can be derived from high-oleic soy oil essentially as described above.

In some embodiments, the HO lecithins are used to improve the properties or characteristics of emulsions. Emulsions comprising HO lecithin can be prepared by combining immiscible liquids with lecithin to form a dispersion, for example, by colloidal milling or homogenization. The surface-active qualities of lecithins make them effective emulsifying agents that reduce mixing time and maintain the stability of the dispersion. As emulsifiers lecithins can be added to the oil phase or the water phase during processing. Fluid lecithins tend to disperse more easily in oil; de-oiled (powdered) lecithins more easily in water. Heating to about 120° F. (50° C.) helps the dispersion and can improve handling and mixing characteristics. Oil-in-water or water-in-oil emulsions can include lecithin at al least about 1%, 2%, 3%, 4% or 5% and less than about 50%, 25%, 20%, 15%, 10%, 9%, 8%, 7%, 6% or 5 of the oil's weight. The emulsification properties of lecithins are a function of their water- or fat-loving qualities, known in the industry as hydrophilic-lipophilic balance or HLB. The improvement or increase in emulsification when using a HO lecithin compared with a control sample containing a comparable lecithin from commodity or non-high-oleic soybean may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%.

In some embodiments the HO lecithins are used as wetting or instantizing agents. The HO lecithins disclosed herein can provide fast, complete wetting of powders into aqueous systems. The instantizing of low-fat powders can be achieved using lecithins with lower hydrophilic-lipophilic balance (HLB) values to retard wetting rates; higher HLB values can be used for fatty powders. Particle size affects lecithin requirements in wetting and instantizing applications. Larger particles have less surface area and can be achieved with up to 0.25% lecithination; smaller particles may be achieved with up to 2% lecithination. Inclusion of lecithins enhances wettability by reducing the static interface of the products, which are expected to show enhanced wettability capabilities compared to a control product.

The HO lecithins described herein show improved wettability when used in a product compared to a control product containing a comparable lecithin from a commodity or non-high-oleic soybean. The improvement or increase in wetting or instantizing of a powder when using a HO lecithin compared with a control sample containing a comparable lecithin from commodity or non-high-oleic soybean may be least about 1%, 5%, 10%, 15%, 20%, 25%, 30%, 35%, 40%, 50%, 75%, 100%, 150%, 200%, 250%, 300%, 350%, 400%, 450% or 500%. The improvement or increase in wetting or instantizing of a powder when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4,6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

In some embodiments the HO lecithins are used as anti-dusting agents or dust suppressants. The improvement or increase in dust suppression of a powder when using a HO lecithin compared with a control sample containing a comparable lecithin from commodity or non-high-oleic soybean may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%. The improvement or increase in dust suppression when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4,6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

In some embodiments the HO lecithins are used as viscosity modifiers. Lecithins generally reduce the surface tension of fats, enabling particles of chocolate, sugar and milk products, for example, to be coated, improving flow and mixability. Typical usage levels are 0.2-0.6% of lecithin of total product weight. The HO lecithins disclosed herein can be combined with a fat sample, such as a high stability oil, to reduce viscosity (resulting from the inhibition of oxidative- and heat-induced increases in oil viscosity) of the sample compared with a control sample which includes a comparable lecithin from a commodity or non-high-oleic soybean.

The viscosity of oily liquid samples can be measured according to ASTM Standard D7042 (ASTM D7042-14, Standard Test Method for Dynamic Viscosity and Density of Liquids by Stabinger Viscometer (and the Calculation of Kinematic Viscosity), ASTM International, West Conshohocken, Pa., 2014, www.astm.org). The Standard method involves the measurement of viscosity, using capillary viscometers (or an equivalent) and density to provide both the dynamic viscosity and kinematic viscosity (dynamic viscosity divided by the density of the test material) measurements of a test substance over a range of temperatures. The Anton Paar SVM 3000 Stabinger Viscometer is an instrument that measures the viscosity of the test substance and its density simultaneously and has been designed to provide dynamic and kinematic viscosity measurements to the ASTM D7042 standard. In some embodiments, the composition or product contain high-oleic soybean oil and high-oleic soybean seed lecithin, and provide a percent reduction in viscosity of oxidative- and heat-induced oil viscosity increases of at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% when compared to a mixture of commodity soybean oil and commodity lecithin, a mixture of commodity soybean oil and high-oleic lecithin or a mixture of high-oleic oil and commodity lecithin. The percent reduction is observed as a result of the inhibition in oxidative- and heat-induced viscosity increase. The reduction in oxidative- and heat-induced viscosity increase of a composition or product when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4,6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

In some embodiments the HO lecithins are used as release agents or antistick agents. Lecithins promote separation of compositions such as edible products and food from contact surfaces, such as in dip tanks and cooking surfaces. Water-filled dip tanks usually contain up to 10% de-oiled lecithin; pan or belt-release applications can use, for example, vegetable oil with approximately 2% lecithin. The HO lecithins described herein, and compositions comprising them, can show a percent increase in effective release compared with a control sample of at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%.

The increase in effective release of a composition or product when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4,6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

In some embodiments the HO lecithins are used as separating agents. When applied directly to products such as processed cheese slices, lecithins help form a stable film barrier that prevents them from sticking together. When used directly in products such as baked goods, they enhance the ability to cut and shape products and reduce sticking to mixing vessels. The products are expected to show improved separating properties compared to a control product. The improvement or increase in antistick or separation when using a HO lecithin compared with a control sample containing a comparable lecithin from commodity or non-high-oleic soybean may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%. The increase in antistick or separation of a composition or product when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

In some embodiments the HO lecithins are used as extrusion aids. Extrusion technology uses lecithin as a processing aid to enhance extrusion rates and throughput, resulting in more economical production. Examples of extruded products include fat-free pretzels, reduced fat snacks and pastas. The products are expected to show increased extrusion rates. The improvement or increase in extrusion when using a HO lecithin compared with a control sample containing a comparable lecithin from commodity or non-high-oleic soybean may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%.

The increase in extrusion of a composition or product when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

In some embodiments the HO lecithins are used to increase the oxidative stability of a composition or product. For example, a composition containing high-oleic soybean oil and high-oleic lecithin with "increased oxidative stability" is a composition that is less susceptible to oxidative degradation when compared to a control. The improvement or increase in oxidative stability when using a HO lecithin compared with a control sample containing a comparable lecithin from commodity or non-high-oleic soybean may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%. The increase in oxidative stability of a composition or product when using HO lecithin compared with a control sample containing a comparable lecithin from commodity or non-high-oleic soybean may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

The increase in oxidative stability can be measured, for example, using OSI, RBOT, Schaal oven or AOM as described herein.

In some embodiments, the HO lecithins described herein can be used with an oil such as a high stability oil. The sources of the oils can include, mineral oil, mid- or high-oleic sunflower oil, low lin- or high-oleic canola oil, safflower oil, peanut oil, palm oil, palm olein oil, or cotton oil and can be transgenic or non-transgenic.

A number of methods are well known to those skilled in the art for determining oxidative stability of oils. One method is the Active Oxygen Method (AOM). This is an accelerated oxidation test in which an oil is aerated under a constant, elevated temperature (97.8° C.) and degradation is monitored by measuring peroxide accumulation. The end point, or induction time, is determined by the number of hours required to reach a peroxide value of 100 mEq/kg. Thus, the longer the induction time the more stable the oil.

The AOM induction time when using a HO lecithin may be increased by at least about 1 hour, 2 hours, 5 hours, 10 hours, 15 hours, 20 hours, 25 hours, 30 hours, 35 hours, 40 hours, 45 hours, 50 hours, 60 hours, 70 hours, 75 hours, 80 hours, 90 hours or 100 hours when compared with a control sample containing a comparable lecithin from commodity or non-high-oleic soybean Another method which can be used to evaluate the stability of commercial cooking oils is the Oxidative Stability Index (OSI) which is measured automatically using a machine manufactured by Ominion, (Ultra-Scientific, North Kingston, R.I., USA). The OSI machine works by bubbling air through oil heated to 110° C. or another defined elevated temperature. As the oil oxidizes, volatile organic acids, primarily formic acid, are formed which can be collected in distilled water in a cell. The machine constantly measures the conductivity of the distilled water and the induction period is determined as the time it takes for this conductivity to begin a rapid rise. Although the data derived from the two methods do not always have a straight correlation, the OSI induction time values for most oils are generally about half those of the AOM derived values. The term "OSI induction time" refers to the time wherein the rate of oxidation is slow until the time after which any resistance to oxidation is overcome.

The Oxidative Stability Index when using a HO lecithin may be increased by at least about 1 hours, 2 hours, 3 hours, 4 hours, 5 hours, 10 hours, 15 hours, 20 hours, 25 hours, 30 hours, 35 hours, 40 hours, 45 hours, 50 hours, 55 hours, 60 hours, 65 hours, 70 hours, 75 hours, 80 hours, 90 hours or 100 hours, 200 hours, 300 hours, 400 hours or 500 hours when compared with a control sample containing a comparable lecithin from commodity or non-high-oleic soybean The oxidative stability of oils and fluids can be measured using a rotary bomb oxidation test (RBOT)(ASTM D-2272). This test is used to evaluate the oxidation characteristics of turbine, hydraulic, transformer and gear oils. The test apparatus consists of a pressurized bomb axially rotating at an angle of 30° from the horizontal in a bath at 150° C. A sample of the test oil with or without commercial additive and water are charged to the bomb containing a copper catalyst coil. The bomb is initially pressurized with oxygen to 90 psi at room temperature. The 150° C. bath temperature causes this pressure to increase to approximately 200 psi. As oxidation occurs, the pressure drops, and the failure point is taken as a 25 psi drop from the maximum pressure attained at 150° C. The results are reported as the number of minutes to the 25 psi loss. An improvement or increase in oxidative stability when using a HO lecithin compared with a control sample containing a comparable lecithin from commodity or non-high-oleic soybean measured using RBOT may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%. The increase in oxidative stability of a composition or product when using HO lecithin compared with a control sample containing a comparable lecithin from commodity or non-high-oleic soybean measured using RBOT may be at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4,6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

The oxidative stability of oils can also be determined in an accelerated aging test known as a Schaal Oven Test. Accelerated aging studies are performed by placing the oil samples in a forced draft oven (Fisher Scientific Model 725F) set at 60° C., according to AOCS Official Method Cg 5-97. Oxidative degradation is measured as titrable peroxide equivalents according to AOCS Method Cd 8-53. Oxidation can also be measured by direct measurements of fatty acid primary and secondary oxidation products, peroxide values, p-anisidine, or TBars.

In some embodiments, the HO lecithins described herein increase the smoke point of an oil or fat containing product, relative to a control in which the oil or is mixed with commodity soybean lecithin. The smoke point of an oil or fat is the temperature at which, under defined conditions, enough volatile compounds emerge from the oil such that a bluish smoke becomes clearly visible. The volatile compounds can include water, free fatty acids, and short-chain degradation products of oxidation. The smoke point is generally different from the higher temperature at which the oil is decomposed and where possibly toxicological relevant compounds are formed. Considerably above the temperature of the smoke point is the flash point, the point at which the vapors from the oil can first ignite when mixed with air and subjected to an ignition source.

The smoke point for an oil varies depending on the origin of the oil and the degree of oil refinement. Heating the oil produces free fatty acid and as this heating time increases, more free fatty acids are produced, thereby decreasing smoke point. It is one reason not to use the same oil to deep fry more than twice. Intermittent frying has a markedly greater effect on oil deterioration than continuous frying. The compositions described herein, for example comprising a combination of high-oleic soybean oil and high-oleic lecithin, are expected to increase the smoke point of the oil-lecithin mixture, when compared to a control. The increase in smoke point when using a HO lecithin compared with a control sample containing a comparable lecithin from commodity or non-high-oleic soybean may be least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%. The increase in smoke point when using a HO lecithin compared with a control sample containing a comparable lecithin from commodity or non-high-oleic soybean may be least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4,6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

The increase in smoke point when using a HO lecithin compared with a control sample containing a comparable lecithin from commodity or non-high-oleic soybean may be least about 0.1° C., 0.5° C., 0.75° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 25° C., 30° C., 35° C., 40° C., 45° C., 50° C., 60° C., 70° C., 80° C., 90° C., or 100° C. and less than about 200° C., 150° C., 100° C., 75° C., 50° C. or 25° C.

In some embodiments the lecithins used were crude preparations. Crude preparations are likely to reduce the smoke point of base oils to a greater extent than more purified lecithins in which contaminants such as sugars have been removed. The use of purified lecithin preparations would be expected to lead to higher smoke points than those reported here because of their improved performance properties when used in high temperature applications.

In some embodiments, the HO lecithins described herein can be used with an oil, such as a high stability oil, in high-temperature applications. Oil oxidation is accelerated in the presence of heat. These compositions are able to withstand heating in applications such as frying, baking, and roasting. In some embodiments, the compositions are free or substantially free of antioxidants which may otherwise be added to improve stability.

In some embodiments one or more antioxidants are included in the compositions. For example, tocopherols, naturally occurring tocopherols, tocotrienols, naturally occurring tocotrienols, Lubrizol (zinc dialkyldithiophosphate) antioxidants, such as LZ 7653, tert-Butylhydroquinone, Decanox MTS-90 (mixed d-alpha, d-beta, d-gamma, and d-delta-tocopherols), natural plant extracts, or a combination thereof can be added.

The HO lecithin-oil compositions described herein may resist oxidation under high temperatures in the absence of any additives or other processing. The decrease in oxidation may be reduced by at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% compared with a control sample containing a comparable lecithin from commodity or non-high-oleic soybean.

The decrease in oxidation may be reduced at least about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10 fold.

Overheating of oils often leads to thermal polymerization of the oil and oxidation products resulting in a gummy, varnish-like buildup on the equipment used for heating and excessive foaming of the oil. As a result of oxidation, a variety of degradation products are formed depending on the conditions under which the oil is exposed. High temperature stability can be evaluated, for example, by exposing the oils to high temperature and monitoring the formation of the undesirable degradation products. These include both volatile and nonvolatile products and may be hydrocarbons, alcohols, aldehydes, ketones, and acids. The nonvolatile components can be further classified into polar and polymerized compounds. The polar and polymerized compounds present in a degraded oil can be analyzed directly by reverse phase high performance liquid chromatography as described in Lin, S. S., 1991, Fats and oils oxidation. Introduction to Fats and Oils Technology (Wan, P. J. ed.), pages 211 232, Am. Oil Chem. Soc. In some embodiments, the reduction in any one or more of these undesirable degradation products when using HO lecithins as described herein can be at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% compared with a control sample containing a comparable lecithin from commodity or non-high-oleic soybean. In some embodiments the HO lecithins are used to prolong the shelf-life of a product. The shelf-life of a composition or product is the maintenance of an acceptable product quality for a set period of time—can be estimated using accelerated methods for shelf life prediction. The kinetic process of destabilization of a composition or product can be rather long—up to several months, or even years for some products. Often the process has to be accelerated in order to test products in a reasonable time during product design. Thermal methods—are the most commonly used—these consist of increasing the emulsion temperature to accelerate destabilization. Mechanical methods of acceleration, including vibration, centrifugation, and agitation, can also be used.

For example, HO lecithin can be incorporated with the amylose portion of wheat flour to slow starch retrogradation, effectively extending shelf life. The high-oleic lecithins described herein show an improved shelf-life compared to control products comprising commodity lecithin. The shelf-life of soybean high-oleic lecithin at 20° C. can extend the shelf life of a product by at least about 2 weeks, 3 weeks, 4 weeks, 1 month, 2 months, 3 months, 4 months, 5 months, 6 months, 7 months, 8 months, 9 months, 10 months, 1 year, 2 years, 3 years or 5 years compared to commodity soy lecithin.

In some embodiments the HO lecithins can be used as nutritional supplements. The nutritional value of lecithin phospholipids, such as phosphatidylcholine (PC), phosphatidylserine (PS) and derivatives such as glycerol-phosphocholine are beneficial to the function of the liver, brain, heart, and other organs. High-oleic lecithins contain unsaturated fatty acids which contribute to their nutritional value. The integrity of the nutritional components of HO lecithin can be preserved though gentle processing technologies and regulated storage conditions which prevent oxidation. Absent these precautions, unsaturated double-bonds can stimulate an auto-oxidation process creating undesirable radicals. The most reactive of radicals can, for example, change DNA, cause inflammation, stress cells and lead to arteriosclerotic plaque. The likelihood of unwanted oxidation of lecithin can be measured through a measurement, for example, of the Peroxide Value (PV), OSI or RBOT.

The increase in any property or characteristic described herein for compositions comprising and uses of the high oleic lecithins disclosed herein can include a percentage increase of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30%.

Useful examples of contents of polyunsaturated fatty acids in a high-oleic lecithin described herein are at least 0.01%, 0.1%, or 1% and less than 16%, 15%, 14%, 13%, 12%, 11%, 10%, 9%, 8%, 7%, 6%, 5%, 4%, 3%, 2%, 1% of the total fatty acid content of the lecithin; such values can be expressed on a relative fatty acid content or weight (wt %) percentage basis.

Useful examples of contents of saturated fatty acids of the lecithin for the use in the compositions and methods described herein are at least 0.01%, 0.1%, or 1% and less than 16%, 15%, 14%, 13%, 12%, 11%, 10%, 9%, 8%, 7%, 6%, 5%, 4%, 3%, 2%, 1% and of the total fatty acid content of the lecithin; such values can be expressed on a relative fatty acid content or weight percentage (wt %) basis.

In some embodiments, methods and compositions for improving the characteristic or properties of a product are provided. The composition may contain the following:
one or more of:
mineral oil, high-oleic soybean oil, mid- or high-oleic sunflower oil, low lin- or high-oleic canola oil, high-oleic safflower oil, palm oil, palm olein oil, olive oil, partially and fully hydrogenated high stability oils and hydrogenated commodity vegetable oils, such as soybean, safflower, peanut, canola, rice bran, corn, cotton, or sunflower oil, a) in the range of 1-99 vol %; and b) a high-oleic soybean seed lecithin in the range of 1-99 vol %.

Methods for producing the compositions by combining the component parts, for example in the amounts or proportions described herein are also provided.

The composition comprising a combination of a) and b) may be used to alter at least one characteristic such as increased effective release, increased oxidative stability, increased smoke point, reduction in oxidative- and heat-induced viscosity increase, increased emulsification, increased wettability or any combination thereof, to a greater degree when compared to a comparable product comprising the oil of a) and a commodity, non-high-oleic soybean seed lecithin.

In some embodiments, a smaller amount or concentration of the HO-lecithin is needed to achieve the same or substantially similar result or effect when compared to a non-high-oleic or commodity soy lecithin used as a control. For example, the amount or concentration of HO-lecithin needed can be less than 95%, 90%, 85%, 80%, 75%, 70%, 60%, 50%, 40%, 30%, 25%, 20%, 15%, 10%, or 5% of the commodity soy lecithin used as a control.

Useful examples of percent volume for the oil in a) and the lecithin in b) and of the combination of the oil in a) and the lecithin in b) are each at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% and less than about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%. The effective amount of the combination which can be used will depend upon the desired properties sought to be achieved in the resulting final product comprising the high-oleic soybeans seed oil in combination with the high-oleic soybean seed lecithin.

The HO lecithin compositions or products disclosed herein can be used in a variety of applications, including in the preparation of edible products, beverages, and foods. Examples include, but are not limited to, uses with oils as coatings, or as ingredients in salad oils, spraying oils, roasting oils, or frying oils. Foods in which the HO lecithin, such as in a composition with a high-stability oil, may be used include, but are not limited to, Instant foods, shortenings, crackers and snack foods, confectionery products, syrups and toppings, sauces and gravies, soups, batter and breading mixes, baking mixes and doughs. Foods which incorporate the HO lecithin, such as in a composition with a high-stability oil, may retain better flavor over longer periods of time due to the improved stability against oxidation imparted by the HO lecithin or composition comprising a high-stability oil and HO lecithin.

In some embodiments, the compositions may further comprise a protein product, such as a soybean protein product, such as meal or isolate. The protein product may contain at least 40%, 41%, 42%, 43%, 44%, 45%, 46%, 47%, 48%, 49%, 50%, 51%, 52%, 53%, 54%, 55%, 56%, 57%, 58%, 59%, 60%, 81%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, %, 89%, 90%, 91%, 92%, 93%, 94%, 95%, 96% or 97% protein (N×6.25) and less than about 99%, 98%, 96%, 95%, 90%, 85%, 80%, 75%, 50%, 25%, 20% or 10% on a moisture-free basis.

In some embodiments, high-oleic soybean seed, whether transgenic or non-transgenic, is used as a source of soy protein product.

In some embodiments, HO lecithins disclosed herein can be used with soy protein products such as whole soybean products as for example roasted soybeans, baked soybeans, soy sprouts, and soy milk, or with processed soy protein products such as full fat and defatted flours, soy grits, soy hypocotyls, soybean meal, soy milk, soy milk powder, soy protein isolates or with specialty soy foods and ingredients, such as soy milk, tofu, tempeh, miso, soy sauce, hydrolyzed vegetable protein and whipping protein, or with soy protein concentrates, textured soy proteins, textured flours and concentrates, textured concentrates, textured isolates, and soy crisps to improve for example wettability and nutritional composition for food and feed applications. Soy protein concentrates refer to those products produced from dehulled, defatted soybeans and typically contain 65 wt % to 90 wt % soy protein on a moisture free basis. As used herein, the term "soy protein isolate" or "isolated soy protein" refers to a soy protein containing material that contains at least 90% soy protein by weight on a moisture free basis. Soy protein products comprising HO lecithins described herein can be incorporated into food, beverages, and animal feed.

In some embodiments, the high-oleic lecithin compositions described herein, such as when combined with soy protein products, can be incorporated into edible products such as food, beverages and animal feed. The term "animal feed" refers to food that is adapted for animals, such as livestock and pets. Some feeds provide a healthy and nutritious diet, while others may be lacking in nutrients. Animals are given a wide range of different feeds, but the two major types of animal feed are processed animal feeds (compound feed) and fodder.

Compound feeds are feedstuffs that are blended from various raw materials and additives and are subject to oxidation. The negative effects of oxidation can be seen in loss of palatability, degradation of the oil component, development of unwanted breakdown products, changes in color, and loss of energy. Meat obtained from animals fed a diet of oxidized feed has significantly lower oxidative status compared to animals fed a feed that has not undergone significant oxidation. For example, meat from animals fed diets containing high-oleic corn products show extended shelf life and greater oxidative particularly when combined with antioxidants such as tocols. HO lecithins disclosed herein can be used to prevent oxidation of feed and feed ingredients to protect both nutritional value and organoleptic quality. The compositions described herein may further contain synthetic antioxidants which are used to preserve feed quality by preventing the oxidation of lipids. There are multiple methods to test the oxidation status of solid materials, such as the protein products comprising HO lecithin described herein. Such methods include accelerating aging methods which predict a material's shelf-life. One test which can be used is to age a material either at room temperature or elevated temperatures and to measure the oxidative status of the material at specific time points. The OSI instrument is useful in this regard in that it reflects the length of time needed to start the oxidation process known as the induction time. A longer induction time means that the material has greater oxidative stability and thereby shelf-life. Other methods include the measurement of volatiles and color change.

HO lecithin composition described herein can be combined with feed grains, such as corn, soybeans, sorghum, oats, and barley. These blends can be formulated according to the specific requirements of the target animal (including different types of livestock and pets) for example, as meal type, pellets or crumbles.

In some embodiments, HO-lecithin compositions, such as when combined with a high-stability oil, can be used in industrial and non-food applications. For example, a high-oleic soybean oil combined with high-oleic lecithin can be low in polyunsaturated fatty acids and have higher oxidative stability and higher temperature stability compared to a control high-oleic oil combined with lecithin obtained from commodity soybeans. Uses for such fluids include without limitation use as an industrial fluid, such as an industrial lubricant, use as a hydraulic fluid, in cosmetics, pharmaceutical products, textiles, lubricants, waxes, adhesives, absorbents, animal feeds, soaps, detergents, fertilizers, inks, paper, pesticides, polymers rubbers, asphalt, masonry, leather, and pigments.

Compositions described herein, such as for use in industrial lubricants and hydraulic fluids, may further include additives such as those specially formulated for use with high-oleic vegetable oils. In some embodiments, additives contain antioxidants and materials which retard, for example, foaming, wear, or rust.

One common method for measuring oxidative stability of oils and fluids, such as industrial fluids is the rotary bomb oxidation test (RBOT; ASTM D-2272). The performance of the compositions and products containing HO lecithins described herein when compared to compositions containing lecithin from commodity soybeans can be measured using the rotary bomb oxidation test, such as is set forth in the examples below.

The high-stability oil-high-oleic lecithin compositions described herein are expected to improve performance in food applications such as is ones described above compared with a control composition comprising lecithin from commodity or non-high-oleic soybeans.

The oil-high-oleic soybean lecithin compositions described herein can be used in a variety of applications, using one or more of a: high-oleic soybean seed oil, mineral oil, mid- or high-oleic sunflower oil, low lin- or high-oleic canola oil, high-oleic safflower oil, olive oil, palm oil, or palm olein oil, partially or completely hydrogenated high stability oils such as, but not limited to high-oleic soybean seed oil, mid- or high-oleic sunflower oil, low lin- or high-oleic canola oil, high-oleic safflower oil, olive oil, palm oil, or palm olein oil and hydrogenated commodity oils such as, but are not limited to cotton oil, soybean oil, peanut oil, safflower oil, rice bran oil, corn oil, canola oil, or sunflower oil. In general, oxidative stability is related to flavor stability. The oil-high-oleic soybean lecithin compositions can be used in the preparation of foods. Examples include, but are not limited to, uses as ingredients, as coatings, as salad oils, as spraying oils, as roasting oils, and as frying oils. Foods in which the oil-high-oleic soybean lecithin compositions may be used include, but are not limited to, crackers and snack foods, confectionery products, syrups and toppings, sauces and gravies, soups, batter and breading mixes, baking mixes and doughs. Foods which incorporate the oil-high-oleic soybean lecithin compositions may retain better flavor over longer periods of time due to the improved stability against oxidation imparted by these compositions.

In some embodiments, the compositions include HO lecithin which is obtained from HO soybeans. A high-oleic soybean oil obtained from high-oleic soybean may also be combined with HO lecithin and used in the methods and compositions described herein. Soybeans with decreased levels of saturated fatty acids have been described resulting from mutation breeding (Erickson et al. (1994) *J. Hered.* 79:465-468; Schnebly et al. (1994) *Crop Sci.* 34:829-833; and Fehr et al. (1991) *Crop Sci.* 31:88-89) and transgenic modification (U.S. Pat. No. 5,530,186 herein incorporated by reference in its entirety).

Two soybean fatty acid desaturases, designated FAD2-1 and FAD2-2, are Δ-12 desaturases that introduce a second double bond into oleic acid to form linoleic acid, a polyunsaturated fatty acid. FAD2-1 is expressed only in the developing seed (Heppard et al. (1996) Plant Physiol. 110:311-319). The expression of this gene increases during the period of oil deposition, starting around 19 days after flowering, and its gene product is responsible for the synthesis of the polyunsaturated fatty acids found in soybean oil. GmFad 2-1 is described in detail by Okuley, J. et al. (1994) Plant Cell 6:147-158 and in WO94/11516. It is available from the ATCC in the form of plasmid pSF2-169K (ATCC accession number 69092). FAD 2-2 is expressed in the seed, leaf, root and stem of the soy plant at a constant level and is the "housekeeping" 12-desaturase gene. The Fad 2-2 gene product is responsible for the synthesis of polyunsaturated fatty acids for cell membranes.

Since FAD2-1 is the major enzyme of this type in soybean seeds, reduction in the expression of FAD2-1 results in increased accumulation of oleic acid (18:1) and a corresponding decrease in polyunsaturated fatty acid content.

Reduction of expression of FAD2-2 in combination with FAD2-1 leads to a greater accumulation of oleic acid and corresponding decrease in polyunsaturated fatty acid content.

FAD3 is a Δ-15 desaturase that introduces a third double bond into linoleic acid (18:2) to form linolenic acid (18:3). Reduction of expression of FAD3 in combination with reduction of FAD2-1 and FAD2-2 leads to a greater accumulation of oleic acid and corresponding decrease in polyunsaturated fatty acid content, especially linolenic acid.

Nucleic acid fragments encoding FAD2-1, FAD2-2, and FAD3 have been described in WO 94/11516 and WO 93/11245. Chimeric recombinant constructs comprising all or a part of these nucleic acid fragments or the reverse complements thereof operably linked to at least one suitable regulatory sequence can be constructed wherein expression of the chimeric gene results in an altered fatty acid phenotype. A chimeric recombinant construct can be introduced into soybean plants via transformation techniques well known to those skilled in the art.

For the purposes of the present disclosure, the omega-reference system is used to indicate the number of carbons, the number of double bonds and the position of the double bond closest to the omega carbon, counting from the omega carbon (which is the terminal carbon of the aliphatic chain and is numbered 1 for this purpose). This nomenclature is shown below in Table 1, in the column titled "Shorthand Notation".

TABLE 1

Nomenclature of Polyunsaturated Fatty Acids

| Common Name | Abbreviation | Chemical Name | Shorthand Notation |
|---|---|---|---|
| Linoleic | LA | cis-9,12-octadecadienoic | 18:2 ω-6 |
| α-Linolenic | αLIN | cis-9,12,15-octadecatrienoic | 18:3 ω-3 |

The term "desaturase" refers to a polypeptide that can desaturate, i.e., introduce a double bond, in one or more fatty acids to produce a mono- or polyunsaturated fatty acid or precursor which is of interest. Despite use of the omega-reference system throughout the specification in reference to specific fatty acids, it is more convenient to indicate the activity of a desaturase by counting from the carboxyl end of the substrate using the Δ-system.

The terms "FAD" and fatty acid desaturase are used interchangeably and refer to membrane bound microsomal oleoyl- and linoleoyl-phosphatidylcholine desaturases that convert oleic acid to linoleic acid and linoleic acid to linolenic acid, respectively, in reactions that reduce molecular oxygen to water and require the presence of NADH.

It is to be understood that the invention is not limited in its application to the details of construction and the arrangement of components set forth in the following description. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless otherwise defined, scientific and technical terms used in connection with the present invention shall have the meanings that are commonly understood by those of ordinary skill in the art. Further, unless otherwise required by context, singular terms shall include pluralities and plural terms shall include the singular.

In this application, the use of "or" means "and/or" unless stated otherwise. In the context of a multiple dependent claim, the use of "or" refers back to more than one preceding independent or dependent claim in the alternative only. Unless otherwise indicated, the term "include" has the same meaning as "include, but are not limited to," the term "includes" has the same meaning as "includes, but is not limited to," and the term "including" has the same meaning as "including, but not limited to." Similarly, the term "such as" has the same meaning as the term "such as, but not limited to." Also, terms such as "element" or "component" encompass both elements and components comprising one unit and elements and components that comprise more than one subunit unless specifically stated otherwise.

As used herein, the term "consisting essentially of" is intended to limit the invention to the specified materials or steps and those that do not materially affect the basic and novel characteristics of the claimed invention, as understood from a reading of this specification. All terms used herein are intended to have their ordinary meaning unless otherwise provided. All amounts provided herein are by weight percent of the total composition unless otherwise indicated.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

All patents and patent applications mentioned in this application are incorporated by reference herein in their entireties for all purposes. In case of conflict between the present disclosure and that of a patent or publication incorporated by reference, the present disclosure controls.

The following non-limiting examples are purely illustrative.

EXAMPLES

The present invention is further defined in the following Examples, in which parts and percentages are by weight and degrees are degrees Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

Example 1

Preparation of High-Oleic Soy Lecithin

Lecithin was prepared from high-oleic soybeans by standard procedures known to those skilled in the art as generally used for the preparation of lecithin from commodity soybeans (KeShun Liu, Soybeans, Chemistry, Technology, and Utilization, printed 1997 by Chapman & Hall, 115 Fifth Ave, New York 10003, pages 313-315, and 340-341, W. Van Nieuwenzhuyzen, Lecithin Production and Properties, J. Am. Oil Chemists Soc., June 1976, 53:425-427). In general lecithin was derived from soy oil in four steps: hydration of phosphatides, separation of the sludge, drying, and cooling.

Example 2

Analysis of Fatty Acid Composition of High-Oleic and Commodity Soy Lecithins

Stocks of either high-oleic or commodity soy lecithin were prepared volumetrically prior to derivatization and analysis, as follows. Approximately 13 mg, (weighed and recorded to an accuracy of 0.1 mg) of Tri-pentadecanoin (Catalog # T-145; NuChek Prep, Elysian, Minn.) was weighed into a tared 10 ml volumetric flask. Heptane (OmniSolv High Purity; EMD-Millipore, Billerica Mass.) was added to approximately ⅔ volume. The flask was sonicated (VWR Aquasonic, Model #75D) at full power for 10 minutes at room temperature to ensure full dissolution of the standard. The outside of the flask was dried and the stock was allowed to come to room temperature for 10 minutes. The flask was placed on an analytical balance, tared and approximately 0.5 g (weighed and recorded to an accuracy of 0.1 mg) of lecithin was added. The flask was vortexed, to disperse the lecithin, and sonicated for 10 min at room temperature to ensure full dissolution. The solution was then allowed to equilibrate at room temperature before the volume was brought to 10 ml with Heptane.

With a calibrated pipette, 100 ul of the stocks were transferred to 13×100 mm screw topped test tubes (VWR #53283-800). Heptane was added to bring the total volume to 300 ul. Three replicate samples were prepared from each stock. One ml of freshly prepared acetyl chloride (Alpha Aesar, Ward Hill Mass.; 10% v:v in anhydrous methanol) was added to each tube and a cap, with a Teflon® liner (VWR #73802-13415), was tightly fitted (Teflon® Pipe thread tape was placed on the threaded part of the tube prior to fitting the cap). The samples were placed into a block heater and heated at 90° C. for 1 h, vortex mixing every 15 min. At the end of the transesterification reaction the samples were brought to room temperature and 1 ml of 1M NaCl, followed by 0.5 ml of heptane was added to each tube. The samples were vortex mixed and the upper organic layer was transferred to amber GC vials fitted with 400 ul volume inserts. GC analysis of the fatty acid methyl esters was performed according to AOCS Official Method Ce 1e-91 on an Agilent 7890GC fitted with a Supelco (Bellefonte, Pa.) Omegawax 320 (30 m×0.320 mm×0.25 um film) capillary column. Detection was by FID. Data analysis was performed using Agilent ChemStation Software and the data has been expressed on a weight % basis, relative to the Tri-Pentadecanoin internal standard.

Example 3

Analysis of Phospholipid Content

Analysis of phospholipid content in lecithin samples was performed by methods known to those skilled in the art and as described for Example in Yingzi et al, Soybean Lecithin fractionation and Functionality, JAOCS, 80(4): 319-326.

Example 4

Measurement of Tocopherol Content, Color and Peroxide Values of High-Oleic and Commodity Soy Lecithins The stocks prepared for the fatty acid analysis (above) were used to determine the tocopherol content according to the AOCS Official Method Ce8-89.

Chromatography was performed on an Agilent 1100 HPLC system fitted with an Agilent Lichrospher Si60 5 u column (4×250 mm) and a fluorescence detector. The excitation and emission wavelengths used were as specified in the AOCS method. Quantitation was performed based on standard curves developed for each of the tocopherols (alpha, beta, delta and gamma) using authentic analytical standards (Supelco, Bellefonte Pa.). Values are expressed as µg tocopherol per gram of sample analyzed (i.e., ppm).

Color Measurements

Sample color was determined on a Lovibond PFX950 Tintometer. Samples were presented in a 10 mm cell and data is reported using the Gardener Scale.

Peroxide Value Measurements

Peroxide values of straight lecithins were determined by iodometric titration on a Mettler-Toledo DL22 Food and Beverage Analyzer (Mettler-Toledo, Schwerzenbach, Switzerland). The proportions of lecithin, solvent, potassium iodide and water were as described in AOCS Official Method Ja 8-87. The concentration of the titrant (sodium thiosulphate) was optimized for the automatic titrator and was 0.01N. Peroxide measurement on Oil/Lecithin mixtures was performed on the Mettler-Toledo DL22 analyzer using the manufacturer's method M346.

p-Anisidine Value

The p-anisidine value is an industry standard method used to determine the secondary oxidation status of oils and oil based products and was measured according to AOCS Official Method Cd 18-90.

Example 5

Composition of High-Oleic and Commodity Lecithin

The composition of high-oleic and commodity soy lecithin were analyzed as described in Example 2, 3, and 4 and are shown in Tables 2-5.

TABLE 2

Tocopherol content of high-oleic and commodity soy lecithin

| | Tocopherol (µg/g) in sample | |
|---|---|---|
| Tocopherol class | High Oleic | Commodity |
| alpha | 45.87 | 23.19 |
| beta | 18.89 | 9.40 |
| gamma | 711.59 | 513.81 |
| delta | 444.53 | 240.54 |
| total | 1220.87 | 786.94 |

TABLE 3

Acetone insoluble components in lecithins

| | sample | | |
|---|---|---|---|
| Components | High Oleic (1) | High Oleic (2) | Commodity |
| % in sample | 62.00 | 61.80 | 62.3 |

TABLE 4

Phospholipid contents of lecithins

| | Phospholipid | % in sample | | |
|---|---|---|---|---|
| | | High Oleic (1) | High Oleic (2) | Commodity |
| | PC | 17.2 | 17.2 | 14.9 |
| | 2-LPC | 1 | 0.9 | 0.8 |
| | PI | 8.7 | 8.9 | 9.7 |
| | PE | 13 | 13.3 | 14.7 |
| | LPE | 0.6 | 0.5 | 0.4 |
| | PA | 3.4 | 3.4 | 3.8 |
| | LPA | 0.2 | 0.2 | 0.1 |
| | Total | 44.1 | 44.4 | 44.4 |
| Acetone Insoluble Part | PC | 25.6 | 24.3 | 23 |
| | 2-LPC | 1.6 | 1.1 | 0.9 |
| | PI | 14.4 | 13.9 | 16.3 |
| | PE | 17.9 | 13.7 | 22.7 |
| | LPE | 0.9 | 1.2 | 0.9 |
| | PA | 5.1 | 4.2 | 6.1 |
| | LPA | 0.2 | 0.2 | 0.2 |
| | Total | 65.7 | 58.6 | 70.1 |
| Acetone Soluble Part | PC | 1.4 | 1.4 | 1.2 |
| | 2-LPC | nd | nd | nd |
| | PI | nd | nd | nd |

TABLE 4-continued

Phospholipid contents of lecithins

| Phospho-lipid | % in sample | | |
|---|---|---|---|
| | High Oleic (1) | High Oleic (2) | Commodity |
| PE | 0.3 | 0.3 | 0.2 |
| LPE | nd | nd | nd |
| PA | nd | nd | nd |
| LPA | nd | nd | nd |
| Total | 1.7 | 1.7 | 1.4 |

TABLE 5

Fatty composition of lecithins

| Fatty Acid | Mean[1] wt % in sample | |
|---|---|---|
| | High Oleic | Commodity |
| C16:0 | 8.20 | 15.52 |
| C16:1 | 0.11 | 0.11 |
| C17:0 | 0.53 | 0.13 |
| C17:1 | 0.94 | 0.07 |
| C18:0 | 3.37 | 4.40 |
| C18:1 | 64.75 | 16.84 |
| C18:2 | 17.11 | 54.48 |
| C19:1A | 0.24 | 0.02 |
| C19:1B | 0.21 | 0.11 |
| C18:3 | 3.01 | 6.84 |
| C20:0 | 0.34 | 0.34 |
| C20:1 | 0.24 | 0.14 |
| C22:0 | 0.44 | 0.48 |
| C24:0 | 0.20 | 0.23 |
| C24:1 | 0.00 | 0.00 |
| Other | 0.33 | 0.30 |

[1] The values reported are the means of three replicate analyses of each lecithin (Example 2).

Example 6

Oxidative Stability Measurements of High-Oleic and Commodity Soy Lecithins

Oxidative stability measurements were performed on an Omnion OSI instrument (Ultra Scientific, North Kingston, R.I.) according to AOCS Official Method Cd 12b-92. Analyses were performed in duplicate at a block temperature of either 110° C. or 120° C.+/−0.1° C. The block temperatures were checked prior to analysis with an ASTM calibrated mercury thermometer (VWR Catalog #61105-342). The analyses were performed on 5 g, weighed to an accuracy of 0.01 g, samples. One drop of silicone antifoam (Dow Corning 200 Food Grade Fluid) was added to each sample prior to analysis to minimize sample foaming and carryover. Two control samples for each oil, one containing a drop of antifoam, the other without, were run to assess the influence of antifoam on the OSI values.

Schaal Oven Method

Accelerated aging studies were performed in a forced draft oven (Fisher Scientific Model 725F) set at 60° C., according to AOCS Official Method Cg 5-97. Prior to sample introduction the 2 oz glass test vials (VWR Straight Sided Jars; part number 89043-266) were rinsed with high purity heptane and allowed to dry overnight in a ventilated hood. Each jar was then rinsed in deionized water and then with double-deionized water. The jars were dried in a forced air oven at 100° C. and allowed to cool to room temperature prior to use. Forty five grams (to an accuracy of 0.01 g) of the test sample was weighed into the jars, taking care not to contaminate the glass surface above the liquid line. Phenolic lids (liners removed and heptane washed) were placed onto the jars so that the threads just engaged but the lids remained loose. Samples were then placed into the oven in a randomized design.

The peroxide value (primary oxidation status), p-anisidine value (secondary oxidation) and color (Gardner) of the samples was measured after 0, 7, 14, 21 and 28 days at 60° C. using the methods described above. Results are shown in FIG. 1 and Table 6.

TABLE 6

Peroxide Values, p-anisidine Values and Gardner Color before (Day 0) and after various times of accelerated aging at 60° C. in a forced air oven (Schaal Oven Test) for high oleic-oil (Plenish ®) with and without inclusion of antioxidants (TBHQ) or with inclusion of high-oleic lecithins at various concentrations.

| Days at 60° C. | High Oleic oil (Plenish ®) | Peroxide Value (mEq/kg) | p-Anisidine Value | Gardner Color |
|---|---|---|---|---|
| 0 | no additions | 0.23 | 1.14 | 1.0 |
| 7 | " | 2.82 | 1.82 | 2.2 |
| 14 | " | 21.59 | 6.70 | 2.6 |
| 21 | " | 37.35 | 13.77 | 3.5 |
| 28 | " | 46.62 | 18.73 | 4.4 |
| 0 | with 180 ppm TBHQ* | 0.19 | 1.29 | 1.0 |
| 7 | " | 0.51 | 1.81 | 2.1 |
| 14 | " | 1.04 | 1.52 | 2.2 |
| 21 | " | 1.46 | 1.85 | 2.3 |
| 28 | " | 1.99 | 1.41 | 2.5 |
| 0 | 1 wt % HO Lecithin | 0.06 | 1.48 | 3.8 |
| 7 | " | 0.27 | 1.34 | 4.3 |
| 14 | " | 1.11 | 1.09 | 4.6 |
| 21 | " | 2.75 | 1.52 | 4.7 |
| 28 | " | 4.64 | 1.79 | 4.9 |
| 0 | 5 wt % HO Lecithin | 0.10 | 2.87 | 7.9 |
| 7 | " | 0.06 | 1.15 | 8.0 |
| 14 | " | 0.24 | 1.54 | 8.0 |
| 21 | " | 0.70 | 1.16 | 8.0 |
| 28 | " | 0.88 | 0.96 | 8.1 |
| 0 | 10 wt % HO Lecithin | 0.14 | 8.65 | 10.2 |
| 7 | " | 0.04 | 1.52 | 10.4 |
| 14 | " | 0.09 | 3.29 | 10.4 |
| 21 | " | 0.38 | 1.52 | 10.5 |
| 28 | " | 0.51 | 1.31 | 10.5 |

[1] *TBHQ = tertiary butylhydroquinone)

In the Schaal oven accelerated aging test a rule of thumb is that 1 day in the test at 60° C. is equivalent to aging the samples for 1 month at room temperature. The data in FIG. 1 and Table 6 show that the antioxidant, TBHQ at 180 ppm, and the high oleic lecithins at 1, 5 and 10 wt % protect the oil from primary and secondary oxidation (the lower the values the greater the protection) during the aging test and that based on both the peroxide and p-anisidine values, the HO lecithin, at addition rates of 5 and 10 wt %, was at least as effective, if not superior (lower Peroxide and p-anisidine values after 28 days at 60° C.) to the TBHQ antioxidant.

Oxidative Stability-OXIDOGRAPH™

Oxidative stability of 100% lecithin samples derived from high-oleic soybeans were measured using OXIDOGRAPH™ (A 0684). The method is applicable to all animal fats, vegetable oils, fatty acids and their derivatives. The test gives an indication of the oxidative stability of oils, fats and their derivatives during storage. The sample (high-oleic or commodity lecithin) was stored under stirring and oxygen atmosphere in a tightly closed reaction chamber, thermostated to a suitable temperature and connected to a pressure change system capable of recording the pressure drop as a function of time. The curve was used to read/calculate the oxidation stability of the sample.

The induction period was calculated from the time until the sample starts increasing the use of oxygen.

TABLE 6a

Oxidation stability and estimated shelf life of lecithins.

| Sample | Oxidation stability[1] | Shelf Life at 20° C. (month)[2] |
|---|---|---|
| High-Oleic Soybean Lecithin (1) | 24.9 | 17.7 |
| High-Oleic Soybean Lecithin (2) | 22.4 | 15.9 |
| Commodity soybean Lecithin | 16.8 | 11.9 |

[1]The OXIDOGRAPH™ was used to measure oxidation stability of 100% lecithin samples.
[2]The shelf life of the listed lecithins was estimated from the induction period derived from measuring oxidation stability on OXIDOGRAPH™.

Example 7

Preparation of Lecithin/Oil Blends

Lecithin stocks were prepared at specific weight percentage values in each of the oils shown in Table 6b.

TABLE 6b

Oils used for preparing lecithin stocks and their fatty acid composition.

| Oil Type and source | 18:1 content (rel %) | Polyunsaturated fat content (rel %) |
|---|---|---|
| Commodity Soybean Oil (Sysco catalog # 5898010) | 23.25 | 60.08 |
| Oil High-Oleic Soybean Oil 10%@120° C. exp; 1%@110° C.; 5%@120° C. (commercial product) | 74.77 | 10.81 |
| High-Oleic soybean Oil for 110° C. exp @10% (commercial product) | 76.39 | 10.22 |
| High-Oleic Sunflower Oil (commercial product) | 84.80 | 7.25 |
| High-Oleic Canola Oil (commercial product) | 78.69 | 12.45 |
| Low-lin Canola Oil (commercial product) | 65.74 | 25.44 |
| Mineral Oil (Grande Epicure; Snow River Products, Crandon WI) | NA | NA |

TABLE 6c

Tocopherol content of the oils used for preparing lecithin stocks (Table 6b)

| | Tocopherol Class and Concentration(μg/g) | | | | |
|---|---|---|---|---|---|
| Oil Type | alpha | beta | gamma | delta | total |
| Commodity Soybean Oil | 124.08 | 15.57 | 774.57 | 266.19 | 1180.41 |
| Oil High-Oleic Soybean Oil 10%@120° C. exp; 1%@110° C.; 5%@120° C. | 61.74 | 10.98 | 515.11 | 205.95 | 793.78 |
| High-Oleic Soybean Oil for 110° C. exp @10% | 135.76 | 20.21 | 696.65 | 268.13 | 1120.74 |
| High-Oleic Sunflower Oil | 558.26 | 17.93 | 4.64 | 0.00 | 580.83 |
| High-Oleic Canola Oil | 199.12 | 0.00 | 330.14 | 6.08 | 535.35 |
| Low-lin Canola Oil | 214.53 | 0.00 | 450.96 | 9.45 | 674.93 |
| Mineral Oil (Grande Epicure; Snow River Products, Crandon WI) | NA | NA | NA | NA | NA |

TABLE 6d

Tocopherol content of oil-lecithin mixtures

| | Tocopherol Class and Concentration(μg/g) | | | | |
|---|---|---|---|---|---|
| Mixture | alpha | beta | gamma | delta | total |
| 10% Commodity Lecithin in Commodity Soy | 113.99 | 14.95 | 748.49 | 263.63 | 1141.06 |
| 10% HO Lecithin in Commodity Soy | 116.25 | 15.90 | 768.27 | 284.03 | 1184.45 |
| 10% Commodity Lecithin in HO soybean oil | 57.89 | 10.82 | 514.98 | 209.41 | 793.09 |
| 10% HO Lecithin in HO soybean oil | 60.16 | 11.77 | 534.75 | 229.81 | 836.49 |
| 10% Commodity Lecithin in HO soybean oil | 124.50 | 19.12 | 678.36 | 265.37 | 1087.36 |
| 10% HO Lecithin in HO soybean oil | 126.77 | 20.07 | 698.14 | 285.77 | 1130.75 |

Stocks were prepared in HDPE (Nalgene) bottles by weighing the required amount of lecithin into the tared bottle to an accuracy of 0.01 g. The oil was then added to bring the total weight of the lecithin plus oil mixture to the desired final weight. For example, for a 10 wt % stock containing 30.25 g of lecithin the weight of the lecithin/oil mixture was brought to 300.25 g with oil. The bottles were capped tightly and mixed vigorously on a vortex mixer for 2 minutes to disperse the lecithin throughout the oil. The mixtures were then placed into a sonicator bath (VWR Aquasonic, Model #75D) and sonicated at full power for 2 min at room temperature. The bottles were then placed on an end over end agitator (Glas-Col; Model number 099ARD50) and mixed at 31 rpm (setting 40) for 60 minutes. Samples were inspected at the end of the agitation period to ensure that they were homogeneous (i.e., that the dark colored lecithin was fully dispersed and that none remained adhered to the walls or bottom of the container).

TABLE 7

OSI Induction time of oils and oil/lecithin blends at various blending ratios (note that the temperature at which the experiments were run varied and is indicated at the extreme left-hand edge of the Table).

| | | | | OSI Induction Time (hours) | | | | | |
|---|---|---|---|---|---|---|---|---|---|
| | % Lecithin in Oil | High Oleic Lecithin (1) | High Oleic Lecithin (2) | Commodity Lecithin | Mineral Oil | Commodity Soybean Oil | High Oleic Soybean Oil | High Oleic Sunflower Oil | High Oleic Canola Oil 75H | High Oleic Canola Oil 65 |
| 110° C. | 10% in CSO[1] | | 32.9 | 33.78 | | 6.95 | | | | |
| | 10% In HOSO[2] | | 187.46 | 136.93 | | | 28.8 | | | |
| | 10% in MO[3] | | >311 | 223.1 | 37.05 | | | | | |
| 120° C. | 10% in CSO[1] | | 15.75 | 17.65 | | 3.1 | | | | |
| | 10% In HOSO[2] | | 101.48 | 79.30 | | | 11.98 | | | |
| | 10% In HOSUN[4] | | 57.15 | 48.25 | | | | 9.43 | | |
| 120° C. | 10% In HOC75[5] | | 64.95 | 49.48 | | | | | 7.1 | |
| | 10% in HOC65[6] | | 35.35 | 32.00 | | | | | | 6.48 |
| | 10% in MO[3] | | >194 | 105.20 | 12.9 | | | | | |
| | 5% in HOSO[2] | | 60.40 | 52.45 | | | 12.95 | | | |
| 110° C. | 1% in CSO[1] | | 10.70 | 10.73 | | 6.95 | | | | |
| | 1% in HOSO[2] | | 57.20 | 56.05 | | | 24.30 | | | |
| | 1% in HOSUN[4] | | 33.40 | 34.28 | | | | 20.18 | | |
| | 1% in HOC75[5] | | 29.45 | 29.60 | | | | | 14.80 | |
| | 1% in HOC65[6] | | 23.43 | 24.43 | | | | | | 13.40 |

[1]CSO = Commodity Soybean Oil,
[2]HOSO = High-Oleic Soybean Oil,
[3]MO = Mineral Oil,
[4]HOSUN = High-Oleic Sunflower Oil,
[5]HOC75 = High-Oleic Canola Oil 75,
[6]HOC65 = Low-Lin Canola Oil.

TABLE 8

Gardner Color 10 mm Gardner Color - Lecithin in Oils before and after heating at 120° C. in an OSI test

| | % Lecithin in Oil | High Oleic Lecithin (2) | Commodity Lecithin | Mineral Oil | Commodity Soybean Oil | High Oleic Soybean Oil | High Oleic Sunflower Oil | High Oleic Canola Oil 75H | High Oleic Canola Oil 65 |
|---|---|---|---|---|---|---|---|---|---|
| | 100% | 15.9 | 13.7 | | | | | | |
| Before OSI | 10% in CSO[1] | 9 | 9 | | 2 | | | | |
| | 10% In HOSO[2] | 9 | 8.5 | | | 1 | | | |
| | 10% In HOSUN[4] | 9 | 8.5 | | | | 1 | | |
| | 10% In HOC75[5] | 9 | 8.5 | | | | | 2 | |
| | 10% in HOC65[6] | 10 | 9 | | | | | | 3 |
| | 10% in MO[3] | 10 | 9 | 1 | | | | | |
| | 5% in HOSO[2] | 9 | 8 | | | 1 | | | |
| After OSI | 10% in CSO[1] | 15.5 | 18 | | 8 | | | | |
| | 10% In HOSO[2] | 16.5 | 14.5 | | | 4 | | | |
| | 10% in HOSUN[4] | 15 | 14 | | | | 8 | | |

TABLE 8-continued

Gardner Color 10 mm Gardner Color - Lecithin in Oils before and after heating at 120° C. in an OSI test

| % Lecithin in Oil | High Oleic Lecithin (2) | Commodity Lecithin | Mineral Oil | Commodity Soybean Oil | High Oleic Soybean Oil | High Oleic Sunflower Oil | High Oleic Canola Oil 75H | High Oleic Canola Oil 65 |
|---|---|---|---|---|---|---|---|---|
| 10% In HOC75[5] | 14 | >18 | | | | | 9.5 | |
| 5% In HOSO[2] | 16 gel flow | 17 gel | | 15 gel | | | 9.5 | |

The addition of lecithins to oils leads to blends with enhanced oxidative stability. This is clearly confirmed by the results given in Table 7. At inclusion rates from 1 to 10% the oil lecithin mixtures displayed at least a 1.5 fold increase in the OSI induction time, when compared to the unfortified oil controls. The protective properties of the lecithin increased as the inclusion rate increased, with 10% inclusion rates resulting in greater than a 4.7 fold increase in the oxidative stability, when compared to the control oils; at an OSI block temperature of 110° C. In order to provide a measure of the relative protective properties of lecithins to other antioxidants, the influence of Tertiary ButylHydroQuinone on the OSI of commodity and high oleic soybean oils is provided in Table 9.

TABLE 9

Effect of the antioxidant Tertiary ButylHydroQuinone (TBHQ) on the oxidative stability of commodity and High oleic soybean oils, as determined by the Oxidative Stability Index (OSI) test.

| | OSI Induction Time (hours@ 110° C.) | | |
|---|---|---|---|
| Oil Type | Without TBHQ | With 180 ppm TBHQ | Fold extension |
| Commodity Soybean Oil | 6.4 | 19.7 | 3.1 |
| High Oleic Soybean Oil | 28.8 | 52.25 | 1.8 |

TBHQ at 180 ppm protected both oils, extending the OSI induction period by 3.1 and 1.8 fold for the commodity and high oleic soybean oils, respectively. In comparison 10 wt % of both commodity and high oleic lecithins extended the OSI induction period of commodity soybean oil by approximately 4.7 fold. The presence of lecithins (at an inclusion rate of 10 wt %) in high oleic soybean oils was much more dramatic, with OSI extensions of 4.8 fold for commodity lecithin and 6.5 fold for high oleic lecithin.

Lecithin inclusion rates of 10% into oils was so protective that another set of experiments was performed at an OSI block temperature of 120° C.; elevating the temperatures accelerates the oxidative destruction of the oils for example, commodity soybean oil displayed an OSI induction time of 6.95 hours at 110° C. compared to 3.10 h at 120° C. Under the higher temperature conditions the lecithin blends were at least 4.9 times more stable than the unprotected control oils. At a 5% lecithin inclusion rate the oxidative stability of the blends at 120° C., as indicated by the OSI induction times, was 4× greater than the unprotected control oil.

An unexpected finding was observed when lecithins from high-oleic soybeans was combined with stable oils from various sources, including non-vegetable mineral oils. When commodity soybean oil, which is known to be unstable, was mixed with lecithins from either commodity or high-oleic sources there was no difference in the protective properties of the two lecithins, at either 110 or 120° C. Unexpectedly however, when high-oleic lecithins were combined with more stable oils i.e., those with an OSI induction time >6 h at 120° C., a significant increase in the stability of the oil/high-oleic lecithin blends (as indicated by OSI induction times) was observed, when compared to the same oil fortified with lecithin from commodity soybeans. The observed effect was least apparent in low lin-oleic canola oil (1.1× the oil/commodity lecithin values at 120° C.) and most apparent in mineral oil (at least 1.8× the oil/commodity lecithin values at 120° C.). High-oleic soybean oil/high-oleic lecithin blends had an OSI induction time 1.3× greater than the same oil containing 10% lecithin from a commodity source. This multiple does not seem too impressive until one looks at the induction times in hours. In the High-oleic soybean oil example the difference in OSI induction time between the oil fortified with high-oleic lecithin was 20 hours greater, at 120° C., than the same oil containing the commodity lecithin. This value should be compared to the 12 hour induction time of the unfortified oil. Similar effects were observed for high-oleic sunflower oil (oil/high-oleic lecithin–oil/commodity lecithin=8.9 hours, compared with an OSI induction period of 9.4 hours for the base oil, at 120° C.) and high-oleic canola oils (oil/high-oleic soybean lecithin–oil/commodity lecithin=15.5 hours, compared with an OSI induction period of 7.1 hours for the base oil, at 120° C.). The most dramatic differential between the protective advantage of high-oleic acid lecithin, when compared to commodity lecithin, was observed in mineral oil where the difference between the OSI induction period between the oil with high-oleic lecithin and the oil with commodity lecithin was at least 1.8 fold (oil/high-oleic lecithin–oil/commodity lecithin=88.8 hours, compared with an OSI induction period of 12.9 hours for the base oil, at 120° C.). The literature (Judde et al., 2003 Antioxidant effect of soy lecithin on vegetable oil stability and their synergism with tocols. Journal of the American Oil Chemists Society 80(12); 1209-1215) teaches that there is a synergy between tocopherols and lecithin that results in the improved anti-oxidation properties when they are included into oils (as we clearly see in our data). A concern was that the high-oleic lecithin used in these studies had significantly more tocopherol than the commodity version (1220.87 ppm vs 786.94 ppm, respectively) and that this may have resulted in the apparent improvement in oil stability of the high stability oils when combined with the lecithin from the high-oleic source. In our studies however, we used several high-oleic soybean oil sources that differed in their tocopherol content (Table 2 and 6c). This resulted in oil/lecithin blends with either the commodity or high-oleic lecithin sources that were substantially equivalent (Table 6d) in their total tocopherol content. Differences in tocopherol contents were therefore not likely to be responsible for the unexpected differences that were observed in the protective properties of commodity and high-oleic soybean lecithins.

Example 8

Preparation of Emulsions,

Commodity soybean oil/water emulsion series (from 9 to 90 weight % oil in water) were prepared as described below. Prior to emulsion preparation the lecithin oil mixtures were first created (using either, lecithin derived from commodity soybeans or, lecithin prepared from high oleic soybeans) such that the final lecithin content in the emulsions, would be 1 wt %. Commodity soybean oil and lecithin (either commodity soybean or high oleic soybean) samples were weighed and recorded (to an accuracy of 0.01 g) directly into tared 250 mL glass bottles (Corning; Cat 1395-250) in the proportions indicated in Table (10).

TABLE 10

Commodity soybean oil/water emulsions were formed in the presence of lecithins derived from commodity or high oleic soybeans. The proportions of the various components used to create the emulsions are given.

| Oil (g) (commodity) | Lecithin (g) (commodity) | % Lecithin in emulsion | Water (g) | Total (g) | % Oil + Lecithin in emulsion |
|---|---|---|---|---|---|
| 9.03 | 1.05 | 1.04 | 92.33 | 101.36 | 10 |
| 19.05 | 1.02 | 1.01 | 81.99 | 101.04 | 20 |
| 29.02 | 1.05 | 1.06 | 70.09 | 99.11 | 30 |
| 39.21 | 1.03 | 1.04 | 60.27 | 99.48 | 40 |
| 49.15 | 1.00 | 1.00 | 50.66 | 99.81 | 50 |
| 59.07 | 1.04 | 1.05 | 40.01 | 99.08 | 61 |
| 69.02 | 1.02 | 1.03 | 30.18 | 99.20 | 71 |
| 79.08 | 1.04 | 1.05 | 20.05 | 99.13 | 81 |
| 89.15 | 1.02 | 1.03 | 10.05 | 99.20 | 91 |

| Oil (g) (commodity) | Lecithin (g) (High Oleic) | % Lecithin in emulsion | Water (g) | Total (g) | % Oil + Lecithin in emulsion |
|---|---|---|---|---|---|
| 9.13 | 1.01 | 1.01 | 90.10 | 100.24 | 10 |
| 19.03 | 1.01 | 1.01 | 80.29 | 100.33 | 20 |
| 29.10 | 1.04 | 1.03 | 71.06 | 101.20 | 30 |
| 39.11 | 1.06 | 1.06 | 60.05 | 100.22 | 40 |
| 49.05 | 1.06 | 1.06 | 50.02 | 100.13 | 50 |
| 59.49 | 1.03 | 1.02 | 40.00 | 100.52 | 60 |
| 69.10 | 1.00 | 1.00 | 30.06 | 100.16 | 70 |
| 79.11 | 1.01 | 1.01 | 20.10 | 100.22 | 80 |
| 88.95 | 1.05 | 1.04 | 10.84 | 100.84 | 89 |

The samples were sonicated (VWR Aquasonic, Model #75D) at full power for 10 minutes at room temperature). When sonication did not adequately disperse the lecithin in the oil, end-over-end agitation and vortex mixing were used to achieve that state (i.e., the dark colored lecithin was fully dispersed and none remained adhered to the walls or bottom of the glass bottle). The bottles containing the oil/lecithin dispersions were tared and water was added (weights added are shown in Table 10A). Once all of the samples in a particular emulsion series had been prepared, a polypropylene cap was placed onto the bottles. The caps had 11.5 mm holes drilled through them so that they could accommodate the homogenizer dispersing element. Emulsions were formed at room temperature by blending with a high speed homogenizer (IKA Ultra-Turrax® T25; IKA Laboratory Equipment; Wilmington N.C.) fitted with a disposable 10 mm dispersing element (IKA S25D-10G-KS Cole Parmer Cat #04720-91Cat #) at full-speed (~24,000 rpm) for 3 minutes.

Example 9

Measuring Emulsion Stability

Immediately after blending each emulsion was poured into a 100 ml glass graduated cylinder. The cylinders were allowed to stand in a vertical position at room temperature. Observations of phase separation were made at 1 hour intervals (for the first 5 hours) and again after 18 h. Photographs were taken at each observation time.

Emulsions prepared in commodity soybean oil with either commodity soybean lecithin or high oleic soybean lecithin were comparable in their stability. The oil remaining suspended in the water in emulsions containing 40 and 50% oil, after 18 h of standing at room temperature. Emulsions containing 80 and 90% oil also remained homogeneous after 18 h. In contrast clear separation of the oil and water phases was apparent in the 10, 20, 30 and 60 and 70% oil, emulsions. In all cases the behavior of the emulsions was independent of the type of lecithin used as the emulsifier; i.e., commodity soybean or high oleic soybean lecithins were comparable in their emulsification properties, in commodity soybean oil.

Example 10

Viscosity Measurements of Oil-Lecithin Samples.

The measurement of dynamic (a.k.a., absolute viscosity and density of test samples was performed to ASTM Standard D7042 specifications, using an Anton Paar SVM 3000/G2 Stabinger viscometer according to the manufacturers directions. Briefly, test samples are introduced into the instrument and the dynamic viscosity and density of the samples was measured at a range of temperatures between 20 and 100° C. The viscosity measurements presented here were determined at 20° C. Viscosity measurements for each sample were measured in triplicate and the mean and standard deviations for these measurements are reported. The sample cell of the viscometer was cleaned, between each sample measurement, by flushing with organic solvents (heptane and toluene). Residual solvent was thoroughly purged from the cell, with a stream of air, prior to introducing the next sample.

In order to demonstrate the ability of lecithins to inhibit heat induced increases in viscosity, test samples containing various weight percent inclusion rates (0, 1, 5 and 10 wt %) of commodity soybean lecithin or high oleic soybean lecithin were prepared in either, commodity soybean or, high oleic soybean oil (as described above). Two, five gram (±0.01 g) aliquots of each test sample were introduced into OSI sample tubes (Example 6). In order to minimize sample foaming and carryover, one drop of silicone antifoam (Dow Corning 200 Food Grade Fluid) was added to each sample prior to placing into the heater blocks of the OSI instrument. The temperature of the heating block was 110° C. (unless stated otherwise) and air was bubbled through each sample at 150 ml/min. Two replicate samples for each base oil or lecithin/oil mixture were removed from the OSI instrument at time points ranging from 6 to 288 hours. If the samples were still liquid at the end of the test period the replicate samples were pooled, by pouring them into a 50 ml centrifuge tubes (VWR; Cat#89039-658). Viscosity measurements were performed on the pooled samples by introducing 3 ml aliquots into the SVM 3000 viscometer (above). Samples of the commodity soybean and high oleic soybean oils, as well as the oil/lecithin mixtures that had not been exposed to the OSI treatment were also measured for comparison.

The results of the test are given in Table 10a.

TABLE 10a

Dynamic viscosity measurements, at 20° C., of commodity soybean oil and high oleic soybean oil either with, or without, the inclusion of commodity soybean or high oleic soybean lecithins at various weight percentages. The samples had been exposed to high temperatures (110° C.) and oxidative conditions (air was bubbled through the samples at 150 ml/min) for various lengths of time prior to measurement of viscosity. The designation "solid" indicates that the samples had turned into a solid mass that could not be removed from the sample tube.

| Oil Type | Lecithin Type | % Lecithin | Dynamic Viscosity (mPA · s) after length of time (hrs) on OSI (110 C. °) | | | | | |
|---|---|---|---|---|---|---|---|---|
| | | | 0 hrs | 6 hrs | 32 hrs | 72 hrs | 144 hrs | 288 hrs |
| Commodity | n/a | 0 | 62 | 64 | 15056 | Solid | Solid | Solid |
| Commodity | Commodity | 1 | 60 | 61 | 1974 | Solid | Solid | Solid |
| Commodity | Commodity | 5 | 63 | 63 | 202 | Solid | Solid | Solid |
| Commodity | Commodity | 10 | 70 | 69 | 70 | 41424 | Solid | Solid |
| Commodity | High Oleic | 1 | 61 | 61 | 3102 | Solid | Solid | Solid |
| Commodity | High Oleic | 5 | 66 | 64 | 313 | Solid | Solid | Solid |
| Commodity | High Oleic | 10 | 80 | 70 | 72 | 31068 | Solid | Solid |
| High Oleic | n/a | 0 | 79 | 80 | 123 | 11635 | Solid | Solid |
| High Oleic | Commodity | 1 | 80 | 80 | 82 | 264 | 32830 | Solid |
| High Oleic | Commodity | 5 | 85 | 84 | 84 | 85 | 577 | Solid |
| High Oleic | Commodity | 10 | 90 | 89 | 90 | 89 | 95 | Solid |
| High Oleic | High Oleic | 1 | 80 | 81 | 82 | 238 | 15204 | Solid |
| High Oleic | High Oleic | 5 | 86 | 85 | 89 | 85 | 177 | Solid |
| High Oleic | High Oleic | 10 | 93 | 91 | 99 | 90 | 92 | 12880 |

In the absence of lecithin the high oleic base oil had a higher viscosity than commodity soybean oil, 79 vs 62 mPA·s, respectively. The viscosity of both base oils increased with exposure to heat and air, although the rates at which they did so differed significantly. After 6 hours on the OSI little change in the viscosity of the commodity soybean oil was observed but after 32 h exposure the viscosity had increased 243 fold. The commodity soybean oil had solidified by the 72 h sampling point. In contrast, the high oleic soybean oil was only 1.6 times more viscous than the starting oil after 32 hours and had risen to 147 times that of the starting oil after 72 h of treatment. The high oleic soybean base oil had solidified in between the 72-144 sampling periods.

In all cases the presence of lecithin (independent of its source) delayed the treatment induced increases in viscosity, in a manner that was dependent on the inclusion rate. At 32 hours the dynamic viscosity of commodity soybean oil containing commodity soybean lecithin, at inclusion rates of 1, 5 and 10 wt % were 8, 75 and 215 times lower than the base oil values, respectively. At 32 hours the dynamic viscosity of commodity soybean oil containing high oleic soybean lecithin, at inclusion rates of 1, 5 and 10 wt % were 5, 48 and 209 times lower than the base oil values, respectively indicating that the high oleic acid lecithins were inhibiting the heat and air induced viscosity increase in commodity soybean oil to a slightly lesser degree. After 72 hours of treatment the commodity soybean base oil and the commodity soybean oils containing 1 and 5 wt % commodity soybean or high oleic soybean lecithins had solidified. The commodity soybean oil samples containing 10 wt % commodity soybean lecithin and that containing 10% high oleic lecithin remained liquid after 72 hours of treatment, with the sample containing the high oleic lecithin having a slightly lower or reduced (×1.3) viscosity. All commodity soybean oil based mixtures had solidified by the 144 h sampling point.

When lecithins were added to high oleic acid soybean oil the delay in the increase in dynamic viscosity was much more dramatic. Both lecithins inhibited the increase in oil viscosity to a similar extent after 32 hours of treatment. At later time points increases in viscosity were observed in a manner that was related to the lecithin inclusion rates. For example, at 72 hours the high oleic oil samples containing either commodity or high oleic lecithin at 5 and 10 wt % had viscosity values similar to those of the starting materials, whereas those containing 1 wt % lecithin had increased significantly, 3.3 and 3.0 fold increases for the samples containing 1 wt % commodity and high oleic lecithins, respectively. The slight differences between the protective properties of commodity and high oleic lecithins, in the high oleic soybean base oil that were apparent after 72 hours of treatment became more dramatic with further exposure. After 144 hours the high oleic oil containing 1 wt % commodity lecithin was 410 times more viscous than the starting material whereas the high oleic oil containing 1 wt % high oleic lecithin was 190 times more viscous than the starting material. Similar trends were observed at the 5 wt % inclusion rates after 144 hours of treatment; 6.8 and 2 fold increases relative to the starting material for the samples containing commodity lecithin and high oleic lecithins, respectively. After 288 hours the high oleic oil with the high oleic lecithin at 10 wt % was the only sample that remained in a liquid form.

Figure 2:
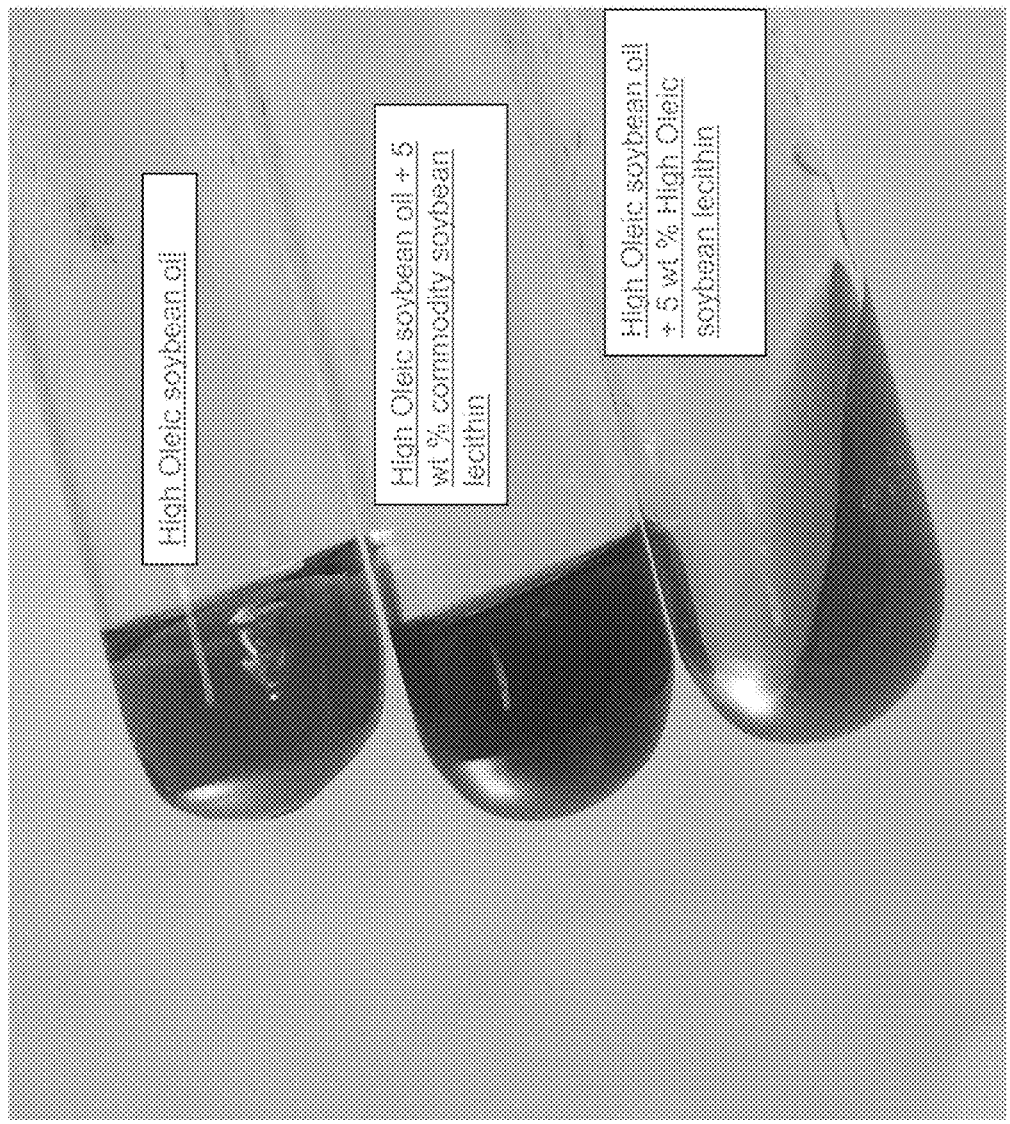
FIG. 2 is an annotated photograph showing the effect of heat treatment (120° C. for 160 h) on the viscosity of high-oleic soybean oil with or without 5 wt % lecithin derived from either commodity or high-oleic soybeans.

The results of another qualitative test to show the inhibitory properties of high-oleic soybean lecithins on viscosity build are shown in FIG. 2. 5 g samples of high-oleic soybean oil with or without 5 wt % inclusions of commodity soybean or high-oleic soybean lecithins were heated at 120° C., in an OSI apparatus, for 160 hours; air was continuously bubbled through the samples at 150 ml/min for the duration of the heating period. The samples were removed from the heating blocks and allowed to cool to room temperature. The tubes were then held at an angle of ~70 degrees from the vertical for ~2 minutes prior to taking the photograph. Clearly the sample containing the high-oleic lecithin was still a flowable liquid, whereas the oil sample without the lecithin, or the sample with 5 wt % commodity soybean lecithin had solidified.

In a supplementary experiment, two replicate samples containing 5 g of high-oleic soybean oil with or without 5 wt % inclusions of commodity soybean or high-oleic soybean lecithins were heated at 120° C., in an OSI apparatus, for 144 hours; air was continuously bubbled through the samples at 150 ml/min for the duration of the heating period. At the end of the heating period the oil samples lacking the lecithin inclusions had solidified and could not be used for further analysis. In contrast oils containing either, 5 wt % commodity soybean lecithin or 5 wt % high oleic soybean lecithin remained as viscous liquids. The replicate samples were pooled and subjected to viscosity measurements on the SVM 3000 viscometer (above). The high oleic acid soybean oil containing the commodity lecithin had a dynamic viscosity of 46027 mPa·s. The high oleic acid sample containing 5 wt % high oleic lecithin was 1.87 times lower (24572 mPa·s).

Taken collectively the data presented above shows that the inclusion of lecithins into oils leads to a retardation of heat/oxidation induced increases in viscosity. The data also clearly show that high oleic lecithins are more protective than commodity lecithins when combined with stable oils such as high oleic soybean oil.

Example 11

Measurement of Smoke Point of Oil and Oil-Lecithin Mixtures.

Smoke Points of base oils and oil lecithin mixtures (all mixtures contained 10 wt % of either commodity or high oleic soybean lecithin) were determined on a Koehler (Bohemia, N.Y.) K13900 Cleveland Open Cup Flash Point Tester according to AOCS Official Method Cc 9a-48. The instrument was fitted with a draft-excluding shield and the region above the sample cup was illuminated with a light beam that was directed across the top of the sample cup. The sample cups were scrupulously cleaned prior to sample introduction. Once the cup containing the sample had been placed over the heater the controller was set so that the temperature of the sample (monitored with an ASTM referenced mercury thermometer reading in degrees Fahrenheit) rose quickly to approximately 75° F. below the expected smoke point (determined in provisional scouting experiments). The controller was then adjusted so that the temperature of the sample rose at between 9 and 11° F. per minute and the sample was continually monitored visually until a continuous stream of bluish smoke was observed. At this point the temperature of the sample (the Smoke Point) was recorded. The smoke point of each oil and oil mixture was determined three times. For the base oils numerous different production batches were measured and the average and standard deviations are given in Table 10b.

TABLE 10b

Smoke Points (in degrees Fahrenheit) of base vegetable oils or base oils containing 10 wt % of commodity or, high oleic, soybean lecithin. The values were determined on a Cleveland Open Cup Flash Point Tester according to AOCS Official Method Cc 9a-48. Delta values show the increase in the smoke point of mixtures containing high oleic soybean lecithin relative to the same oil containing commodity soybean lecithin.

| Oil Type | Lecithin Type (at 10 wt %) | ID | Smoke Point (° F.) | Delta |
|---|---|---|---|---|
| Commodity Soybean Oil[1] | n/a | CPE000425 | 445 +/- 5 | 7 |
| Commodity Soybean Oil | Commodity | TSI000188 | 345 | |
| Commodity Soybean Oil | High Oleic | TSI000087 | 352 | |
| High-Oleic Soybean Oil[2] | n/a | | 456 +/- 5 | 13 |
| High-Oleic Soybean Oil | Commodity | TSI000186 | 352 | |
| High-Oleic Soybean Oil | High Oleic | TSI000185 | 365 | |
| High-Oleic Canola Oil[3] (HOC75) | n/a | CPE000093 | 444 +/- 5 | 4 |
| High-Oleic Canola Oil (HOC75) | Commodity | TSI000190 | 347 | |
| High-Oleic Canola Oil (HOC75) | High Oleic | TSI000189 | 350.6 | |
| High-Oleic Sunflower Oil[4] | n/a | CPE000093 | 447 +/- 2 | 11 |
| High-Oleic Sunflower Oil | Commodity | TSI000180 | 345 | |
| High-Oleic Sunflower Oil | High Oleic | TSI000179 | 356 | |

[1]Mean of 4 different productions
[2]Mean of 10 different productions
[3]Mean of 2 different productions
[4]Single production The data indicate that the addition of commodity and high oleic lecithins into oils results in a significant reduction of the smoke point, relative to the base oil samples alone. In all cases tested however, the blends containing high oleic soybean lecithin had higher smoke points than the blends containing commodity soybean lecithin.

The lecithins used in these studies were crude preparations and are likely to reduce the smoke point of base oils to a greater extent than more purified lecithins in which contaminants such as sugars have been removed. The use of purified lecithin preparations would be expected to lead to higher smoke points than those reported here because of their improved performance properties when used in high temperature applications.

What is claimed is:

1. A method for improving the characteristics of a product, the method comprising producing the product by combining high-oleic soybean oil with a high-oleic soybean seed lecithin in an amount effective to improve at least one characteristic of the product, wherein the improved at least one characteristic comprises improved oxidative stability index (OSI) induction time when compared to a control product, the control product comprising the oil and a comparable amount of commodity non-high oleic soybean seed lecithin.

2. The method of claim 1, wherein the product comprises high-oleic soybean seed lecithin in an amount of at least 5 wt % of the product.

3. The method of claim 1, wherein the product comprises high-oleic soybean seed lecithin in an amount of at least 10 wt % of the product.

4. The method of claim 1, wherein the improved at least one characteristic comprises an increase in OSI induction time of at least 1.5-fold compared to the control product.

5. The method of claim 1, further comprising combining the product with at least one antioxidant selected from the group consisting of tocopherols, tocotrienols, naturally occurring tocopherols, naturally occurring tocotrienols, zinc dialkyldithiophosphate antioxidant, tert-Butylhydroquinone, natural plant extracts, and a combination thereof.

6. The method of claim 1, wherein the product is combined with water or a composition comprising water.

7. The method of claim 1, wherein the product is combined with soy protein product.

8. The method of claim 7, wherein the soy protein product is a soybean isolate.

9. The method of claim 1, wherein the characteristic further comprises a reduction in an increase in viscosity induced by oxidation or heating of the product.

10. The method of claim 1, wherein the product comprises high-oleic soybean seed lecithin in an amount of at least 1 wt % of the product.

11. The method of claim 1, further comprising providing the product contained in a dispensing apparatus comprising a pump spray or an aerosol spray.

12. The method of claim 1, wherein the high-oleic soybean oil is a high stability high olcic soybcan oil has an OSI value of at least 12 hours at 110° C.

13. The method of claim 4, wherein the high-oleic soybean oil has an OSI value of at least 12 hours at 110° C.

14. A method for improving the characteristics of a product, the method comprising producing the product by combining high-oleic soybean oil, with a high-oleic soybean seed lecithin in an amount effective to improve at least one characteristic of the product, the improved at least one characteristic comprising an improved oxidative stability index (OSI) induction time of at least 1.8 fold, when compared to a control product, the control product comprising the oil and a comparable amount of commodity non-high oleic soybean seed lecithin.

15. The method of claim 14, wherein the product comprises high-oleic soybean seed lecithin in an amount of at least 1 wt % of the product.

16. The method of claim 14, wherein the characteristic further comprises a reduction in an increase in viscosity induced by oxidation or heating the product.

17. The method of claim 14, wherein the product comprises high-oleic soybean seed lecithin in an amount of at least 5 wt % of the product.

18. The method of claim 14, further comprising providing the product contained in a dispensing apparatus comprising a pump spray or an aerosol spray.

19. The method of claim 14, wherein the high-oleic soybean oil has an OSI value of at least 12 hours at 110° C.

* * * * *